United States Patent [19]

Takaishi

[11] Patent Number: 6,166,871
[45] Date of Patent: Dec. 26, 2000

[54] METHOD FOR DECODING HEAD POSITION SIGNAL INCLUDING ON-THE-FLY COMPENSATION FOR MISREAD TRACK NUMBER

[75] Inventor: Kazuhiko Takaishi, Kawasaki, Japan

[73] Assignee: Fujitsu Limited, Kawasaki, Japan

[21] Appl. No.: 08/901,385

[22] Filed: Jul. 28, 1997

Related U.S. Application Data

[63] Continuation of application No. 08/516,568, Aug. 18, 1995, abandoned.

[30] Foreign Application Priority Data

Jan. 13, 1995 [JP] Japan .................................... 7-004011

[51] Int. Cl.$^7$ ........................................................ G11B 5/09
[52] U.S. Cl. ...................... 360/53; 360/78.14; 360/77.08; 360/77.04
[58] Field of Search ............................. 360/78.14, 77.08, 360/53, 77.04

[56] References Cited

U.S. PATENT DOCUMENTS

| 5,426,544 | 6/1995 | Narita et al. | ........................... 360/77.04 |
| 5,659,438 | 8/1997 | Sasamoto et al. | ................... 360/78.09 |

FOREIGN PATENT DOCUMENTS

| 61-59677 | 3/1986 | Japan . |
| 62-145578 | 6/1987 | Japan . |
| 4328368 | 11/1992 | Japan . |
| 5210926 | 8/1993 | Japan . |
| 5234288 | 9/1993 | Japan . |
| 9211636 | 7/1992 | WIPO . |

*Primary Examiner*—Alan Faber
*Attorney, Agent, or Firm*—Greer, Burns & Crain, Ltd.

[57] ABSTRACT

A method for generating a reliable head position signal including track number validation. A head position signal is generated using two triangular signals PosN and PosQ having a phase difference of a ¼ period, and a track number which is recorded on the medium. The track number is validated by comparing the relationship of the signs of the signals PosN, PosQ with the track number according to a predetermined rule. The track number may be a corrected if the track number was misread. Subsequently, a position signal generator demodulates the position signal on the basis of the absolute values of signals PosN, PosQ, the signs of the signals PosN, PosQ, and the track number. The accuracy of the head position signal is further improved using a conversion coefficient (position sensitivity factor) for correcting the amplitudes of the signals PosN and PosQ. A position sensitivity determining portion generates a sum signal (PosN+PosQ) and/or a difference signal (PosN−PosQ) and positions a head at a point of a track at which the absolute values of the signals PosN, PosQ are equal by using either of the sum signal and the difference signal. The position sensitivity determining portion then measures the sum signal |PosN|+|PosQ| of the absolute values of signals PosN, PosQ , and determines the position sensitivity factor so that the measured value is equal to a preset value.

10 Claims, 22 Drawing Sheets

DECODING TABLE : NO TRACK NUMBER MISREAD DETECTED

| NUMBER | N | Q | TRACK | DECODING |
|---|---|---|---|---|
| (1) | + | + | ODD | Q + Track − 0.5 |
| (2) | + | + | ODD | −N + Track |
| (3) | − | + | ODD | −N + Track |
| (4) | − | + | ODD | −Q + Track + 0.5 |
| (5) | − | − | EVEN | −Q + Track − 0.5 |
| (6) | − | − | EVEN | N + Track |
| (7) | + | − | EVEN | N + Track |
| (8) | + | − | EVEN | Q + Track + 0.5 |

Q : PosQ , N : PosN

DECODING TABLE : TRACK NUMBER MISREAD IS DETECTED

| NUMBER | N | Q | TRACK | DECODING |
|---|---|---|---|---|
| (1) | + | + | EVEN | Q + Track + 0.5 |
| (2) | + | + | EVEN | −N + Track + 1.0 |
| (3) | − | + | EVEN | −N + Track − 1.0 |
| (4) | − | + | EVEN | −Q + Track − 0.5 |
| (5) | − | − | ODD | −Q + Track + 0.5 |
| (6) | − | − | ODD | N + Track + 1.0 |
| (7) | + | − | ODD | N + Track − 1.0 |
| (8) | + | − | ODD | Q + Track − 0.5 |

Q : PosQ , N : PosN

FIG. 5A

DECODING TABLE : NO TRACK NUMBER MISREAD DETECTED

| NUMBER | N | Q | TRACK | DECODING |
|---|---|---|---|---|
| (1) | + | + | ODD | Q + Track − 0.5 |
| (2) | + | + | ODD | −N + Track |
| (3) | − | + | ODD | −N + Track |
| (4) | − | + | ODD | −Q + Track + 0.5 |
| (5) | − | − | EVEN | −Q + Track − 0.5 |
| (6) | − | − | EVEN | N + Track |
| (7) | + | − | EVEN | N + Track |
| (8) | + | − | EVEN | Q + Track + 0.5 |

Q : PosQ , N : PosN

FIG. 5B

DECODING TABLE : TRACK NUMBER MISREAD IS DETECTED

| NUMBER | N | Q | TRACK | DECODING |
|---|---|---|---|---|
| (1) | + | + | EVEN | Q + Track + 0.5 |
| (2) | + | + | EVEN | −N + Track + 1.0 |
| (3) | − | + | EVEN | −N + Track − 1.0 |
| (4) | − | + | EVEN | −Q + Track − 0.5 |
| (5) | − | − | ODD | −Q + Track + 0.5 |
| (6) | − | − | ODD | N + Track + 1.0 |
| (7) | + | − | ODD | N + Track − 1.0 |
| (8) | + | − | ODD | Q + Track − 0.5 |

Q : PosQ , N : PosN

FIG.6A (IN THE CASE OF USING PosN)

| N | Q | TRACK | DECODING |
|---|---|---|---|
| × | + | ODD | −N + Track |
| × | − | EVEN | N + Track |
| + | + | EVEN | −N + Track + 1.0 |
| − | + | EVEN | −N + Track − 1.0 |
| − | − | ODD | N + Track + 1.0 |
| + | − | ODD | N + Track − 1.0 |

Q : PosQ, N : PosN

FIG.6B (IN THE CASE OF USING PosQ)

| N | Q | TRACK | DECODING |
|---|---|---|---|
| + | × | EVEN | Q + Track + 0.5 |
| + | × | ODD | Q + Track − 0.5 |
| − | × | ODD | −Q + Track + 0.5 |
| − | × | EVEN | −Q + Track − 0.5 |

Q : PosQ, N : PosN

FIG.7A (IN THE CASE OF USING PosN)

| N | Q | TRACK | DECODING |
|---|---|---|---|
| × | + | ODD | −N + Track |
| × | − | EVEN | N + Track |
| × | + | EVEN | −N + Track +sgn(N)*1.0 |
| × | − | ODD | N + Track −sgn(N)*1.0 |

Q : PosQ
N : PosN

FIG.7B (IN THE CASE OF USING PosQ)

| N | Q | TRACK | DECODING |
|---|---|---|---|
| + | × | EVEN | Q + Track +even(Track)*0.5 |
| − | × | ODD | −Q + Track −even(Track)*0.5 |

Q : PosQ
N : PosN

FIG.8

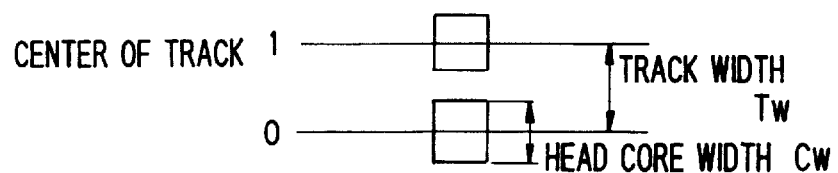

FIG. 11

| CENTER OF POSITIONING (TARGET POSITION) | PARTITION | DECODING AT NORMAL TIME (POSITION SIGNAL) | DECODING AT ABNORMAL TIME (POSITION SIGNAL) |
|---|---|---|---|
| EVEN-NUMBERED TRACK + 0.25 | 2 | (N+Q)/2+0.25+Tr | (N+Q)/2−0.75+Tr |
| EVEN-NUMBERED TRACK − 0.25 | 11 | (N−Q)/2−0.25+Tr | (N−Q)/2+0.75+Tr |
| ODD-NUMBERED TRACK + 0.25 | 8 | −(N+Q)/2+0.25+Tr | −(N+Q)/2−0.75+Tr |
| ODD-NUMBERED TRACK − 0.25 | 5 | −(N−Q)/2−0.25+Tr | −(N−Q)/2+0.75+Tr |

Q : PosQ , N : PosN , Tr : TRACK NUMBER (DECODING TABLE : NORMAL CASE)

| NUMBER | N | Q | TRACK | DECODING |
|---|---|---|---|---|
| (1) | + | + | ODD | Q + Track − 0.5 |
| (2) | + | + | ODD | −N + Track |
| (3) | − | + | ODD | −N + Track |
| (4) | − | + | ODD | −Q + Track + 0.5 |
| (5) | − | − | EVEN | −Q + Track − 0.5 |
| (6) | − | − | EVEN | N + Track |
| (7) | + | − | EVEN | N + Track |
| (8) | + | − | EVEN | Q + Track + 0.5 |

ABSOLUTE VALUES OF GRADIENTS OF PosN
AND PosQ ARE ASSUMED TO BE THE SAME

SUM OF ABSOLUTE VALUES IS CONSTANT

METHOD FOR DECODING HEAD POSITION SIGNAL INCLUDING ON-THE-FLY COMPENSATION FOR MISREAD TRACK NUMBER

This application is a continuation of application(s) Ser. No. 08/516,568 Abandoned filed on Aug. 18, 1995.

BACKGROUND OF THE INVENTION

The present invention relates to a position signal demodulating method and a position sensitivity determining method for a filing apparatus and, more particularly, to a position signal demodulating method for generating a head position signal by using two triangular signals PosN and PosQ which have a phase difference of a ¼ period and which are obtained by reading the head positioning signal pattern recorded on a medium in advance, and a position sensitivity determining method for correcting the signals PosN and PosQ.

In a filing apparatus such as an optical disk apparatus and a magnetic disk apparatus, data is read/written by positioning a head at a predetermined position on a disk. FIG. 21 shows the structure of a magnetic disk apparatus. In FIG. 21, the reference numeral 11 represents a cover, and 12 a base. A predetermined number of magnetic disks 14, which are recording media, are attached to a spindle mechanism 13 in parallel with each other at regular intervals, and an actuator assembly 16 which can be freely rotated by a rotary shaft 15 is provided in the vicinity of the magnetic disk 14. The actuator assembly 16 is composed of a driving portion (actuator) 17 on one side of the rotary shaft 15 and a carriage arm 18 on the other side. The driving portion 17 is provided with a voice coil 19 which constitutes a voice coil motor. The same number of carriage arms 18 as the number of the magnetic disks 14 are provided, and a magnetic head assembly 21 is attached to one side or both sides of an adapter plate provided at the end of the carriage arm 18. The carriage arm 18 positions a magnetic head 22 at a predetermined position in the radial direction of the magnetic disk 14.

A multiplicity of tracks are formed on the surface of the magnetic disk 14, and each track is divided into a plurality of sectors. Each sector is provided with a servo area SVA and a data area DTA, as shown in FIG. 22, and a sector mark (servo mark) SM, a track number TNO, and a position information pattern PPT are recorded in the servo area SVA. When a position information pattern signal (head output) read by the magnetic head 22 which moves in the radial direction is passed through a demodulator circuit, two triangular position signals PosN and PosQ which alternate in the transverse direction of the track and which are spaced at $\pi/2$ (½ of the track width, which corresponds to a ¼ period on the assumption that one period is two tracks) phase intervals are obtained, as indicated by the solid lines in FIG. 23A. It is also possible to produce a sawtooth position signal (offset signal indicating the deviation from the center of the track) Pa by sequentially selecting the position signals PosN and PosQ and the inverted position signals *PosN and *PosQ, as shown in FIG. 23B.

FIG. 24 shows a servo circuit for positioning the head at a target position. In FIG. 24, the reference numeral 13 represents a spindle motor, 14 a magnetic disk rotated by the spindle motor 13, 19 a rotary voice coil motor (VCM) for moving the magnetic head in the radial direction, and 22 a magnetic head for reading/writing data.

The reference numeral 23 denotes an AGC circuit for automatically controlling the gain of a signal read by the head 22 so that the level is constant. The reference numeral 24 represents a position signal demodulator which demodulates the position information pattern signals read by the magnetic head 22 so as to output the two position signals PosN, PosQ which have a phase difference of $\pi/2$ with respect to each other. The reference numeral 25 denotes an AD converter for converting the position signals PosN, PosQ output from the demodulator 24 into digital values, and 26 a microcontroller unit (MCU) for outputting a designated current value for driving the VCM 19 as a result of servo control, which will be described later, a DA converter 27 for converting the digital designated current value into an analog value, and a VCM driving circuit 28. The AGC circuit 23, the position signal demodulator 24 and the AD converter 25 constitute a read/write circuit.

The MCU 26 conducts servo control by the firmware provided therein, and outputs a designated current value for driving the VCM 19. A block diagram of the function of the processing of the firmware is shown in FIG. 24. In FIG. 24, the reference numeral 26a represents a position detector for detecting a position at which the head 22 is currently situated by using the two position signals PosN, PosQ and a track No., 26b a speed detector for detecting the actual speed Va by differentiating the position signals PosN, PosQ, 26c a designated speed generator for outputting a predetermined designated speed Vc on the basis of the number of tracks between the track at which the head 22 is currently situated and the target track, 26d a speed difference calculator for outputting a difference signal Vd indicating the difference between the designated speed Vc and the actual speed Va, 26e a position signal selector for outputting the offset signal (position deviation signal) Pa shown in FIG. 23B by sequentially selecting the position signals PosN and PosQ and the inverted position signals *PosN and *PosQ, and 26f a switching portion for outputting the designated current value which corresponds to the speed difference signal Vd output from the speed difference calculator 26 until the head 22 reaches the target track, and outputting the designated current value which corresponds to the position deviation signal Pa when the head 22 reaches the target track. The reference numeral 26g denotes a position sensitivity determining portion for determining a position sensitivity Sp in a position sensitivity determination mode by using the signals PosN, PosQ. The signals PosN, PosQ are multiplied by the position sensitivity Sp obtained from the position sensitivity determining portion 26g at the time of ordinary positioning control, thereby correcting the amplitudes of the signals PosN, PosQ. It is also possible to input the position sensitivity Sp to the AGC circuit 23 so as to correct the amplitudes of the signals PosN, PosQ.

When the target track is input, the designated speed generator 26c generates the designated speed Vc on the basis of the number of tracks between the track at which the head 22 is currently situated and the target track. The switching portion 26f selects the speed difference signal Vd and outputs it as the designated current value for the voice coil motor 19. The voice coil motor 19 then starts to rotate and moves the head 22 toward the target track at the designated speed. The head reads the position information pattern PPT recorded in the servo area while moving and outputs the signals. The read signals (head outputs) of the position information pattern PPT are input to the position signal demodulator 24, and the position signals PosN, PosQ are demodulated and input to the MCU 26. By using the position signals PosN, PosQ and the track number, the position detector 26a updates the track at which the head 22 is currently situated, the speed detector 26b detects the actual speed of the head 22 and the position signal selector 26e outputs the position deviation signal Pa.

The designated speed generator 26c generates the designated speed Vc again on the basis of the number of tracks between the track at which the head 22 is currently situated and the target track, and the speed difference calculator 26d outputs the difference signal Vd indicating the difference between the designated speed Vc and the actual speed Va. The switching portion 26f selects and outputs the speed difference signal Vd, and thereafter the same operation is repeated, so that the head 22 approaches the target track.

When the head 22 reaches the target track, the switching portion 26f switches the speed control over to the positioning control, selects the position deviation signal Pa output from the position signal selector 26e and outputs it as the designated current value. The designated current value is converted into an analog value and input to the voice coil motor 19. The voice coil motor 19 then rotates so that the head 22 is situated at the center of the track. The head position is controlled by the positioning control based on the position deviation signal Pa and, finally, the head 22 is positioned at the center of the target track. Thereafter, tracking servo control is executed so that the head 22 is situated at the center of the track.

The servo control is continuously executed in the above explanation. Actually, however, the MCU 26 discretely executes the servo control at every predetermined sampling time. To state this concretely, a servo mark SM is recorded in the servo area SVA of each sector, and servo interruption occurs in the MCU 26 every time the servo mark SM is read. When the servo interruption occurs, the MCU 26 fetches the position signals PosN, PosQ and executes the above-described processing on the basis of the position signals PosN, PosQ. In other words, the period of servo interruption constitutes the sampling period, and the discrete servo control is executed at every sampling. The MCU26 calculates a head position signal by adding the track number TN0 read from the servo area SVA to the position deviation signal Pa, and executes a servo control based upon the calculated head position signal.

(a) First Problem

FIG. 25 is an explanatory view of signals for explaining the principle of demodulating head position signals, and FIG. 26 is a decoding table used for decoding head position signals. In FIG. 25, the reference numeral 31 represents a signal PosN, 32 a signal PosQ and 33 a position deviation signal (offset signal) Pa. The abscissa represents a track number, and the ordinate represents a value (−0.5 to 0.5) of an output signal converted into the position from the center (0.0) of the track. For example, if it is assumed that the peak voltage Vp (=±2.0 volt) of the signals PosN and PosQ is converted to the valve 0.5, the value obtained by multiplying the voltage V of PosN, PosQ by 0.5/Vp (=¼) is represented by the ordinate. A position sensitivity is a gain which makes a peak value which is not 0.5 equal to 0.5. Accordingly, if the peak value is represented by Pk, the position sensitivity Sp is given by the following equation:

$Pk \cdot Sp = 0.5$ $Sp = 0.5/Pk$ (1)

In a conventional decoding method, a decoding table such as shown in FIG. 26 is created in advance, and position signals are generated by using the signals PosN, PosQ and a track number in accordance with the program of the MCU. To state this concretely, (i) two consecutive tracks are partitioned into 8 partitions (1) to (8), as shown in FIG. 25, (ii) the signal having the smaller absolute value of the two signals PosN and PosQ is selected in each partition, (iii) the selected signals are connected with each other while the polarities are appropriately changed, thereby generating the sawtooth offset signal Pa which has a rising gradient and which alternates with a period of the track width, and (iv) the track number is added to the offset signal so as to generate a position signal (absolute position signal relative to the reference position). The reason why the signal having the smaller absolute value of the two signals PosN and PosQ is used to generate the offset signal Pa is that when the absolute values of the signals PosN and PosQ become large, the signals become nonlinear due to saturation or the like, so that the relationship between the position and the signals PosN and PosQ becomes nonlinear.

In this manner, a head position signal is conventionally generated by using the decoding table shown in FIG. 26, but this method is adopted on assumption that the track number is correctly read. In other words, misreading of a track number is not taken into consideration in the conventional position signal demodulating method. Since the head reads the position signal pattern and the track number from the servo area SVA of a sector while moving, the head sometimes mistakes the number of the adjacent track for the number of the current track. In this case, since the position signal is wrongly demodulated, correct positioning control and speed control is impossible.

(b) Second Problem

In the read/write circuit, the signals PosN and PosQ are fetched via the AD converter 25, but it is necessary to convert the values of the signals into a unit of a track which is used in the MCU 26. For this purpose, the conversion coefficient (position sensitivity) Sp is obtained and the signals PosN and PosQ are multiplied by the conversion coefficient (position sensitivity). Since the position sensitivity depends upon the core width of the head, there are difference position sensitivities for the respective heads in the same filing apparatus. The position sensitivity also depends upon a change in the gain in the AGC circuit 23, a change in the reference voltage in the AD converter 25, the core width of the read head, and the track width. For example, if the core width of the head becomes small, the position sensitivity also becomes small, and if the track width becomes small, the position sensitivity becomes large.

If the position sensitivity is too large or too small, the angle of the inclination of the signals PosN and PosQ becomes larger or smaller than an ideal angle θi of those signals shown in FIG. 25. For this reason, the connection between the signals PosN and PosQ is not smooth at the time of creation of a head position signal based upon the decoding table in FIG. 26, and there is sometimes a difference in level in the demodulated position signal, as shown in FIG. 27. The broken line in FIG. 27 is an ideal curve of the position signal and (1)–(8) in FIG. 29 indicate the division number for decoding. When the position signal is discontinuous, the positioning control is not uniform, vibration or abnormal sound is produced, and prompt positioning is impossible. To prevent this, several position sensitivity determining methods have heretofore been proposed.

(i) First Method

A first method is a fundamental method in which the position sensitivity is obtained as follows.

(1) The head is positioned at the positions of ±0.25 track of each of the even- and odd-numbered tracks, namely, four positions in total (positions a, b, c and d in FIG. 25 at which the absolute values of the signals PosN and PosQ are equal) by the signal PosN.

(2) The absolute values of the signals PosN and PosQ are obtained, and only when the difference between the absolute values is in a preset range, the signal PosN is adopted as the measured value, and the value |PosN| is stored.

(3) When the measurement of the absolute values is finished at all the positions, the average value of the measured values is obtained, and the position sensitivity Sp is obtained as the value |PosN| at the 0.25 track from the following formula:

$$Sp=0.25/|PosN| \quad (2)$$

Since value |PosN| at the 0.25 track position is regarded as the half of a peak value Pk of the signal PosN, |PosN|= Pk/2 is obtained. Substituting |PosN| in equation (2) with Pk/2, Sp=0.5/Pk, i.e., equation (1) is obtained.

The first method, however, has the following problems.

(1) Since the signal is positioned at the ±0.25 track before the position sensitivity is corrected, it is not guaranteed that the positioning at the ±0.25 track is accurate.

(2) Since the signal PosN has a gradient in the vicinity of the ±0.25 track, it constantly changes.

(3) It is impossible to measure the position sensitivity unless the condition that the absolute values of the signals PosN and PosQ are in a predetermined range is satisfied.

(ii) Second Method

FIG. 28 is an explanatory view of a second position sensitivity determining method. In this method, the position sensitivity is obtained in the following manner.

(1) The voice coil motor VCM is operated at an approximately equal speed.

(2) The values (Y[k−2], Y[k−1]) of the signal PosQ for the latest two samplings are stored in the memory.

(3) The value (Y[k]) of the signal PosN at the point of time at which the signal used for generating a position signal is switched from the signal PosN to the signal PosQ or vice versa is stored in the memory.

(4) The straight line LQ of the signal PosQ is calculated from the values Y[k−2], Y[k−1] of the signal PosQ for the latest two samplings and the straight line LN of the signal PosN which passes the current value Y[k] of the PosN and has the reverse gradient to that of the line LQ is calculated. The intersection of the two straight lines LQ, LN is then obtained.

(5) Thereafter, the position sensitivity Sp is obtained from the following formula:

$$Sp=0.25/|Vc|$$

wherein Vc represents the voltage at the intersection.

The second method, however, has the following problems.

(1) Since the sensitivity is not corrected, the position as the reference for speed control is inaccurate. It is therefore not guaranteed that the speed is an equal speed.

(2) Since the head moves at a certain speed, if the speed is too high, there is a possibility of the signals PosN and PosQ entering a saturation region, which makes the Sp inaccurate.

(iii) Third Method

FIG. 29 is an explanatory view of a third position sensitivity determining method. In this method, the position sensitivity is determined as follows.

(1) The voice coil motor VCM is operated at an approximately equal speed.

(2) The sum |PosN|+|PosQ| of the absolute values of the signals PosN and PosQ is measured at the point of time at which the signal for generating a position signal is switched between the signals PosN and PosQ. In other words, the sum |PosN|+|PosQ| of the absolute values of the signals PosN and PosQ when the head is situated at the ±0.25 tracks of the even- and odd-numbered tracks is measured. The sum of the absolute values is ideally the constant value (=0.5).

(3) Thereafter, the position sensitivity Sp is obtained from the following formula:

$$Sp=0.5/(|PosN|+|PosQ| \dots \quad (3).$$

Since (|PosN|+|PosQ|) is equal to the peak value Pk of the signals PosN and PosQ, equation (1) is obtained from the equation (3).

This method has similar problems to those of the second method.

As described above, according to the conventional methods, it is impossible to realize accurate position sensitivity correction. Therefore, new logic for determining the position sensitivity is demanded.

SUMMARY OF THE INVENTION

Accordingly, it is a first object of the present invention to eliminate the above-described problems in the related art and to provide a position signal demodulating method which is capable of generating a correct position signal even if the track number is misread.

It is a second object of the present invention to provide a position signal demodulating method which is capable of simplifying the logic for the generation of a position signal, thereby economizing a memory.

It is a third object of the present invention to provide a position sensitivity determining method which is capable of accurately determining a position sensitivity and, hence, enhancing the positioning accuracy.

It is a fourth object of the present invention to provide a position sensitivity determining method which is capable of accurately determining a position sensitivity by excluding the values in the vicinity of saturation even if the signals PosN and PosQ are saturated.

It is a fifth object of the present invention to provide a position sensitivity determining method which is capable of measurement for the determination of a position sensitivity by returning a head to a predetermined position even if the head moves to a saturation region, or leaves from the target at the time of position sensitivity determining control.

It is a sixth object of the present invention to provide a position sensitivity determining method which is capable of determining a position sensitivity without making positioning servo system unstable even if a large change generates in the gain at the time of determining the position sensitivity.

It is a seventh object of the present invention to provide a position sensitivity determining method which obviates the determination of a position sensitivity every time the power is turned on once the position sensitivity is determined.

It is an eighth object of the present invention to provide a position sensitivity determining method which is capable of adjusting a position sensitivity in correspondence with the partition to which a track belongs, and which is capable of easily determining the position sensitivity in each partition.

To achieve the first and second objects, in a first aspect of the present invention, there is provided a position signal demodulating method for a filing apparatus for generating a head position signal by using two triangular signals PosN and PosQ which have a phase difference of a ¼ period and which are obtained by reading a head positioning signal pattern recorded on a medium in advance, and by using a track number which is recorded on the medium, the method comprising the steps of: determining whether or not the track number is misread, and demodulating a head position signal on the basis of the absolute values of signals PosN, PosQ, the signs of the signals PosN, PosQ, the track number.

To achieve the third object, in a second aspect of the present invention, there is provided a position sensitivity determining method for a disk apparatus for generating a head position signal by using a signal obtained by multiplying two triangular signals PosN and PosQ which have a phase difference of a ¼ period and which are obtained by reading head positioning information pattern recorded on a medium in advance by a position sensitivity factor, and by using a track number which is recorded on the medium, the method comprising the steps of: generating a sum signal (PosN+PosQ) and/or a difference signal (PosN−PosQ) of the signals PosN and PosQ; positioning the head at a point of a track at which the absolute values of the signals PosN, PosQ are equal by using at least either of the sum signal and the difference signal; measuring the sum signal |PosN|+|PosQ| of the absolute values of the signals PosN, PosQ at this time; and determining the position sensitivity so that the measured value is a preset value.

To achieve the fourth object, in a third aspect of the present invention, there is provided a position sensitivity determining method for a filing apparatus comprising the steps of: measuring a saturation voltage when the head is positioned at a point of a track at which either of the signals PosN, PosQ is saturated; judging whether or not the absolute value of the signal PosN or PosQ is nearly equal to the saturation voltage when the head is positioned at a point of a track at which the absolute values of the signals PosN, PosQ are equal; and not using the sum signal |PosN|+|PosQ| of the absolute values of the signals PosN, PosQ so as to determine a position sensitivity in a case where the absolute value of said signal PosN or PosQ is nearly equal to said saturation voltage.

To achieve the fifth object, in a position sensitivity determining method provided in a fourth aspect of the present invention, processing for generating a head position signal by using the signals PosN, PosQ and the track number is executed in parallel with the position sensitivity determining processing, and when the head position is deviated, the head is returned to a predetermined position by using the head position signal.

To achieve the sixth object, in a fifth aspect of the present invention, there is provided a position sensitivity determining method for a filing apparatus comprising the steps of: determining a position sensitivity by constituting a head positioning control system of the filing apparatus so that it operates stably without being subjected to a change in the gain; and returning the head positioning control system to an ordinary head positioning control system after determining the position sensitivity.

To achieve the seventh object, in a position sensitivity determining method for a filing apparatus provided in a sixth aspect of the present invention, the determined position sensitivity is stored in a fixed memory which is capable of holding the stored state even if the power is turned off, and the signals PosN, PosQ are corrected by reading the position sensitivity when the filing apparatus is started.

To achieve the eighth object, in a position sensitivity determining method for a filing apparatus provided in a seventh aspect of the present invention, a track is divided into a plurality of partitions, a position sensitivity is measured in each partition, and the signals PosN, PosQ are corrected by using the position sensitivity which corresponds to track position.

Other features and advantages of the present invention will be apparent from the following description taken in conjunction with the accompanying drawings.

BRIEF DESCRIPTION OF THE DRAWINGS

FIGS. 5A and 5B show decoding tables for decoding a position signal;

FIGS. 6A and 6B show decoding tables in the case of using PosN and PosQ, respectively;

FIGS. 7A and 7B show decoding tables obtained by compressing the logic of the decoding tables shown in FIGS. 6A and 6B, respectively;

FIG. 8 shows the relationship between a head width and a core width;

FIG. 11 shows a decoding table for positioning at the time of measuring a position sensitivity;

FIG. 30 shows a flow chart for generating a head position signal based upon the track number, PosQ and PosN; and FIG. 31 shows a flowchart for generating a head position signal when the signal PosQ and PosN are compensated by the position sensitivity.

DESCRIPTION OF THE PREFERRED EMBODIMENTS

(A) SCHEMATIC EXPLANATION OF THE INVENTION

Figure 1:
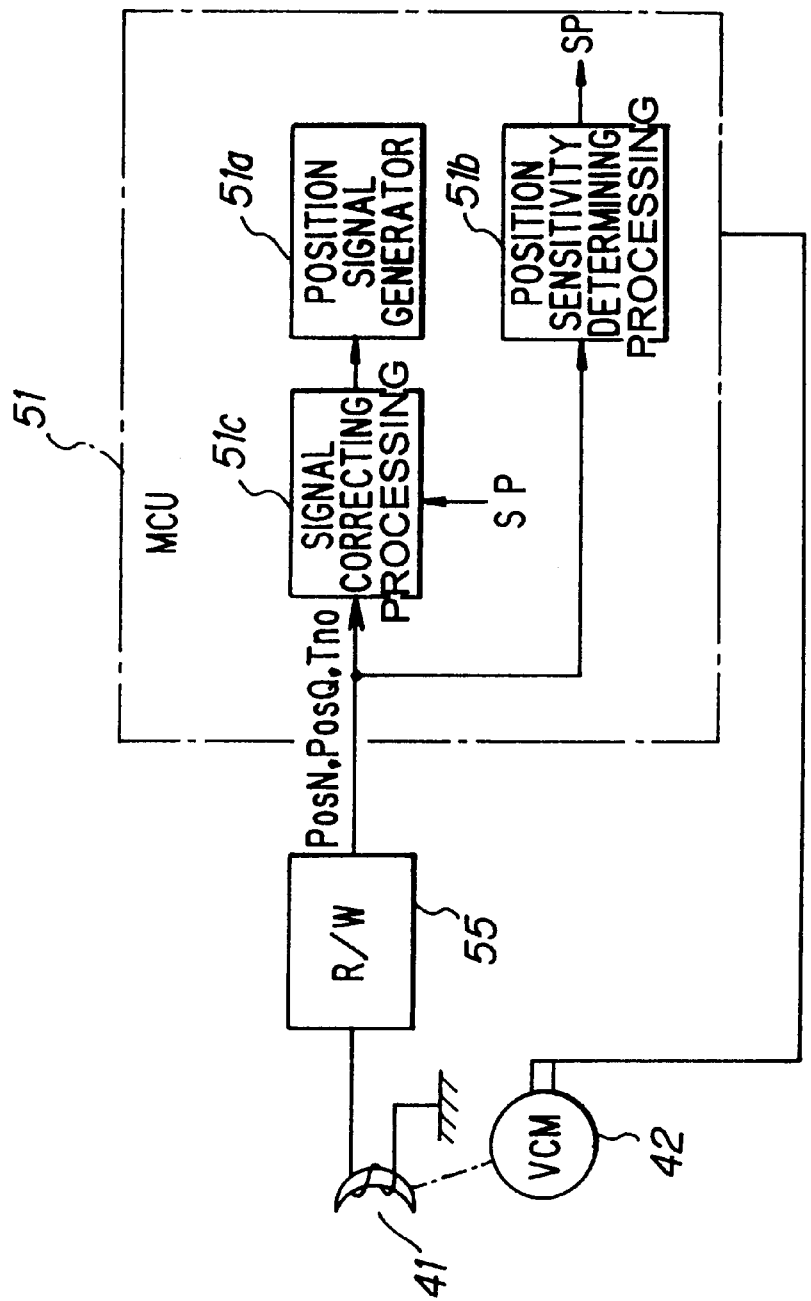
FIG. 1 is a schematic explanatory view of the principle of the present invention.

FIG. 1 is a schematic explanatory view of the present invention. In FIG. 1, the reference numeral 41 represents a head, 42 a voice coil motor VCM, 51 a microcontroller unit MCU, and 55 a read/write circuit. The reference numeral 51a denotes a position signal generator, 51b a position sensitivity determining portion, 51c a signal correcting portion for multiplying signals PosN, PosQ by a position sensitivity Sp.

(a) Demodulation of a Position Signal

A signal pattern for positioning a head and a track number Tno are recorded on a head position signal is generated by using track number Tno and the two triangular signals PosN and PosQ. The position signal generator 51a demodulates the head position signal with the absolute values of the signals PosN, PosQ, the signs of the signals PosN, PosQ, the track number, and misreading of the track number taken into consideration. When the absolute value of the signal PosN is smaller than the absolute value of the signal PosQ, a position signal is generated (1) by inverting the polarity of the signal PosN when the polarity of the signal PosQ is positive, and adding the polarity inverting signal to the track number, (2) by adding the signal PosN to the track number without inverting the polarity of the signal PosN when the polarity of the signal PosQ is negative, and (3) by adding or subtracting 1 to and from the position signal obtained by either of (1) and (2) in accordance with the signs of the signals PosN, PosQ when misreading of the track number is detected. It is regarded that misreading of the track number has occurred if the sign of PosQ is positive and the read track number is an even number, or if the sign of PosQ is negative and the read track number is an odd number. On the on other hand, when the absolute value of the signal PosQ is smaller than the absolute value of the signal PosN, a position signal is generated by adding 0.5 or −0.5 to the signal PosQ depending upon whether the track number is an even number or an odd number, and adding the signal PosQ', obtained by the addition to the track number without inverting the polarity thereof when the polarity of the signal PosN is positive, while inverting the polarity of the signals PosQ' when the polarity of the signal PosN is negative.

In this manner, it is possible to generate a correct position signal even if the track number is misread, and to simplify the logic for generating a position head signal, thereby economizing a memory. Furthermore, if a head position signal is generated by using the corrected value obtained by multiplying the signals PosN, PosQ by the position sensitivity, it is possible to enhance the positioning accuracy.

(b) Determination of a Position Sensitivity

The position sensitivity determining portion 51b generates a sum signal (PosN+PosQ) and a difference signal (PosN−PosQ) of the signals PosN, PosQ, positions the head at the point on the track at which the absolute values of the signals PosN, PosQ are equal by using either of the sum signal and the difference signal, measures the sum signal |PosN|+|PosQ| of the signals PosN, PosQ at that time, and determines the position sensitivity Sp so that the measured value is a preset value (=0.5). Namely, the position sensitivity Sp is determined so that Sp·[|PosN|+|PosQ|] is equal to the preset value 0.5. In this case, a saturation voltage when the head is positioned at a point of a track at which either of the signals PosN, PosQ is saturated is measured and stored in advance. How to measure the saturation voltage is described later in connection with FIG. 10. Judgement is made as to whether or not the absolute value of the signal PosN or PosQ is nearly equal to the saturation voltage when the head is positioned at a point of the track at which the absolute values of the signals PosN, PosQ are equal, and if the answer is YES, the sum signal |PosN|+|PosQ| of the absolute values of the signals PosN, PosQ at that time is not used to determine the position sensitivity.

In this manner, it is possible to determine the position sensitivity accurately and, hence, enhance the positioning accuracy. In addition, even if the signals PosN, PosQ are saturated, it is possible to determine the position sensitivity Sp accurately by excluding the values in the vicinity of saturation. Furthermore, if a position signal is generated by using the corrected value obtained by multiplying the signals PosN, PosQ by the position sensitivity, it is possible to enhance the positioning accuracy.

In parallel with the position sensitivity determining processing, processing for generating a head position signal by using the signals PosN, PosQ and the track number Tno is executed. In this way, even if the head position moves to a saturation region or leaves from the target track at the time of the position sensitivity determining processing, it is possible to return the head to a predetermined head position on the basis of the position signal, and to continue the position sensitivity determining processing.

The position sensitivity is determined by a head positioning control system of the filing apparatus which operates stably without being subjected to a change in the gain, and the head positioning control system is returned to an ordinary head positioning control system after the position sensitivity is determined. In this manner, it is possible to continue the position sensitivity determining control even if a large change generates in the gain during the position sensitivity determining control.

The determined position sensitivity is stored in a fixed memory which is capable of holding the stored state even if the power is turned off, and the signals PosN, PosQ are corrected by reading the position sensitivity when the filing apparatus is started. In this manner, it is possible to obviate the position sensitivity determining control once the position sensitivity is determined.

A track is divided into a plurality of partitions, a position sensitivity is measured in each partition, and the signals PosN, PosQ are corrected by using the position sensitivity which corresponds to the track position. In this manner, it is possible to correct the signals PosN, PosQ by using the position sensitivity which corresponds to the track position, and accurate positioning control is possible. In this case, the position sensitivity measured in each partition of a predetermined medium is stored, and a position sensitivity in a predetermined partition of a filing apparatus as the object of measurement is measured. The difference between the measured position sensitivity and the stored position sensitivity in the corresponding partition is calculated. Thereafter, the stored position sensitivities in the other partitions are translated in parallel by the value equivalent to the difference so as to obtain the position sensitivities in the other partitions of the filing apparatus as the object. In this manner, the position sensitivity is determined easily and in a short time.

(B) STRUCTURE OF A MAGNETIC FILING APPARATUS OF THE INVENTION

Figure 2:
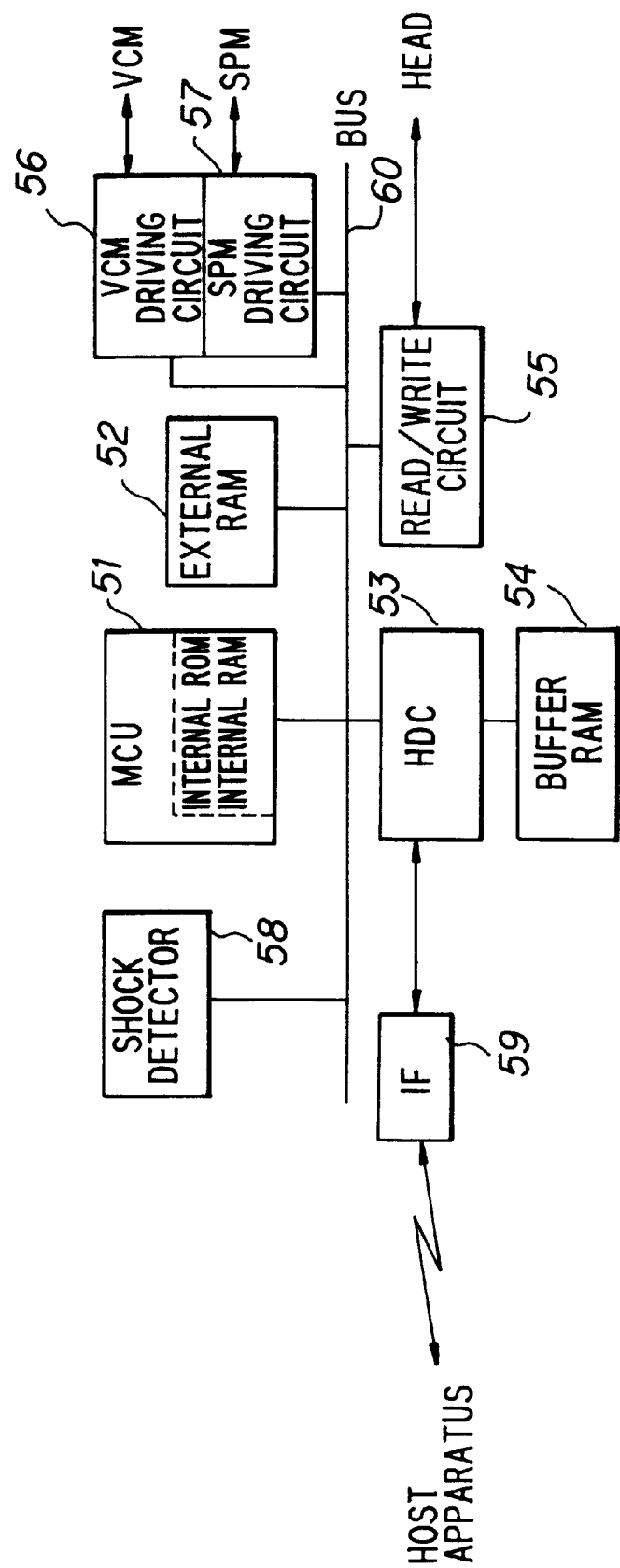
FIG. 2 shows the structure of a magnetic filing apparatus.
Figure 24:
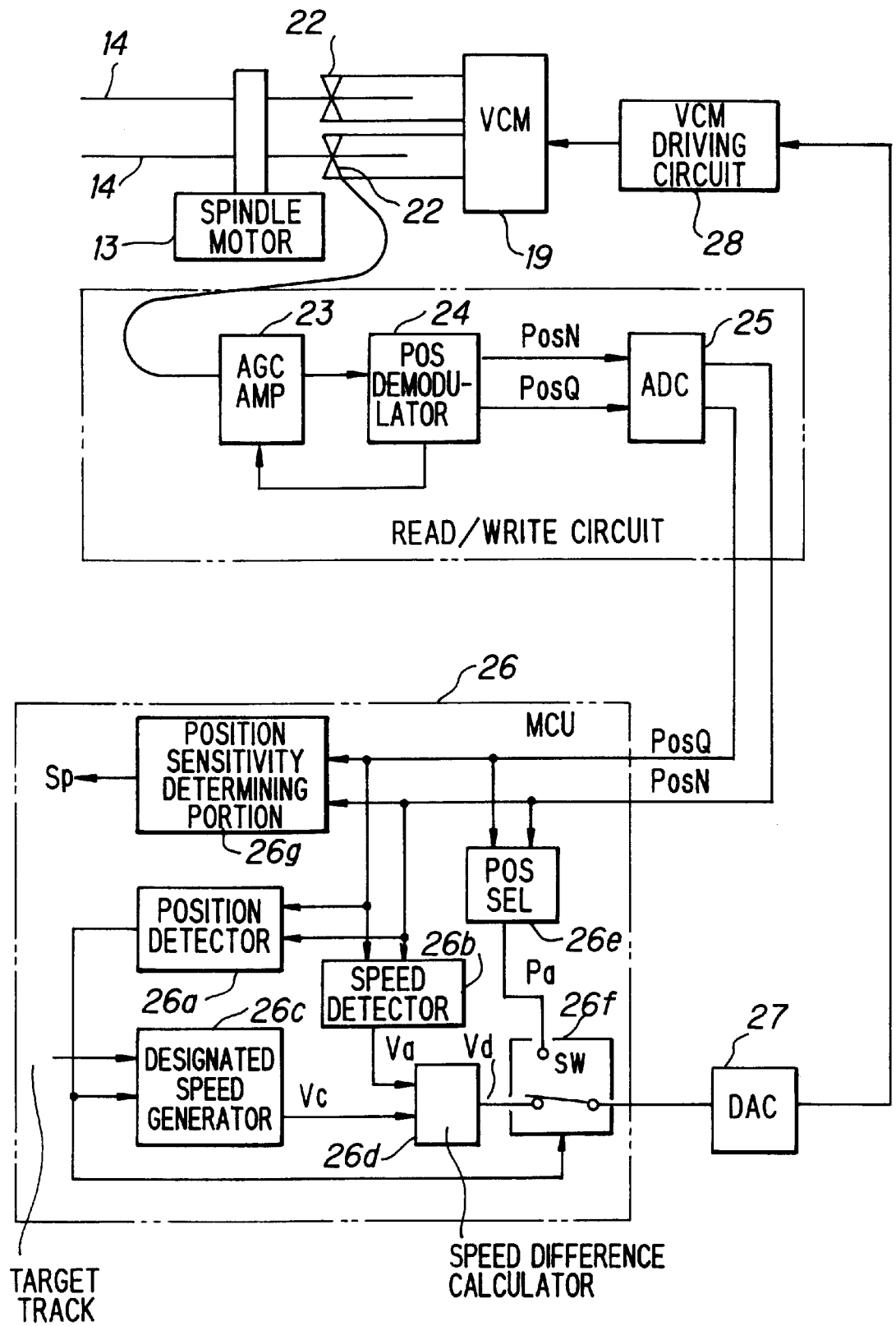
FIG. 24 shows the structure of a servo circuit.
Figure 25:
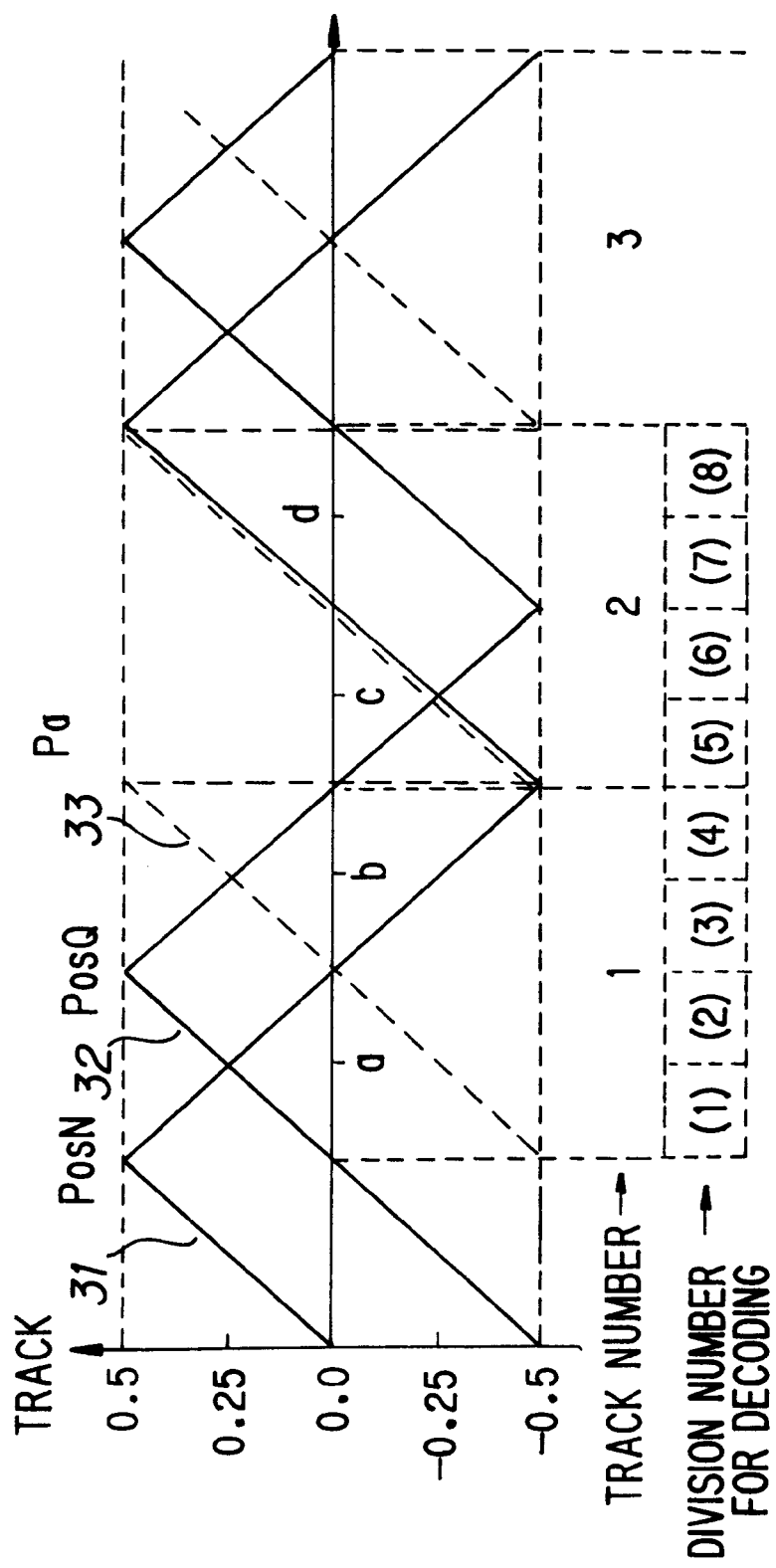
FIG. 25 shows the wave forms of the signals PosN, PosQ.

FIG. 2 shows the structure of a magnetic filing apparatus. In FIG. 2, the reference numeral 51 represents a microcontroller unit (MCU) which executes servo control and other control in the same way as the MCU 26 shown in FIG. 24.

Figure 3:
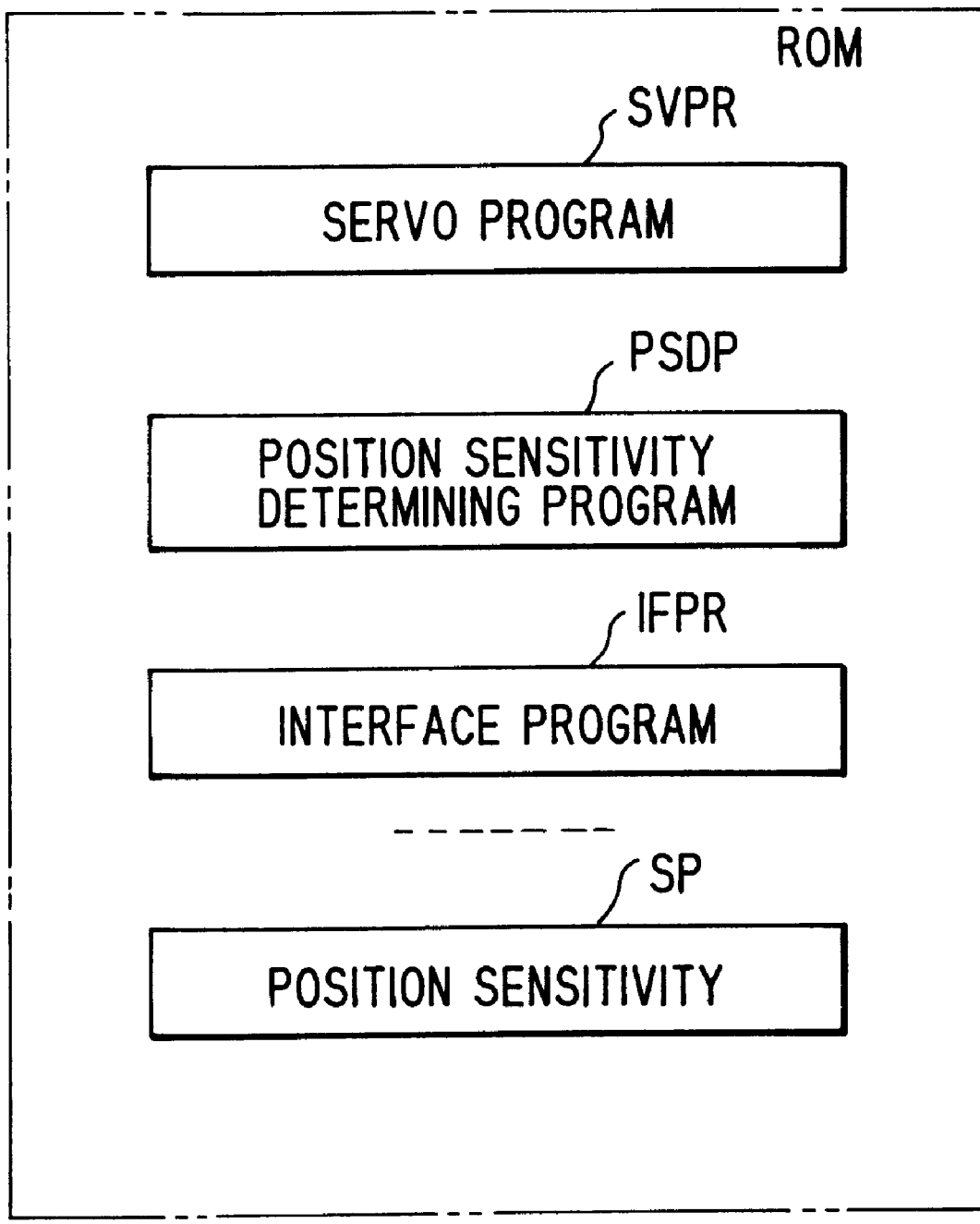
FIG. 3 shows the contents stored in the ROM in an MCU.

MCU 51 accommodates a ROM and a RAM. The ROM stores various programs including (1) a program SVPR for servo control, (2) a program PSDP for determining a position sensitivity, and (3) an interface program IFPR, as shown in FIG. 3. The ROM also stores various parameters. If the ROM is a rewritable ROM such as a flash memory, the determined position sensitivity Sp is also stored therein. The MCU 51 executes servo control processing in accordance with the servo program SVPR so as to control the machine parts such as a voice coil motor VCM and a spindle motor SPM.

The servo control processing includes (1) processing for correcting the signals PosN, PosQ on the basis of the position sensitivity Sp, (2) position signal generating processing, (3) command speed generating processing, (4) processing for calculating the current value of the voice coil motor VCM, and (5) processing for controlling the rotational speed of the spindle motor SPM. The MCU 51 also executes position sensitivity determining processing, which will be described later, in accordance with the position sensitivity determining program PSDP. The MCU 51 further sets a read/write circuit 55 and supplies and receives data and a command to and from an external apparatus by operating a hard disk controller 53 in accordance with the interface program IFPR.

The reference numeral 52 represents an external RAM, 53 a hard disk controller HDC which is connected to a host apparatus via an interface, 55 a read/write circuit which is connected to the head so as to read/write data and read the signals PosN, PosQ and the track number, 56 a VCM driving circuit for driving the voice coil motor VCM, 57 a SPM driving circuit for driving the spindle motor SPM, and 58 a shock detector for detecting a shock applied to the filing apparatus by a shock sensor provided therein. When there is a shock, since an error in the reading/writing of data occurs, the MCU 51 stops the reading/writing operation so as to prevent malfunction. The reference numeral 59 represents an interface portion between the filing apparatus and an external apparatus. It is possible to supply and receive data to and from each element through a bus 60.

(C) GENERATION OF A SIGNAL (a) First Position Signal Generating Method

Figure 4:
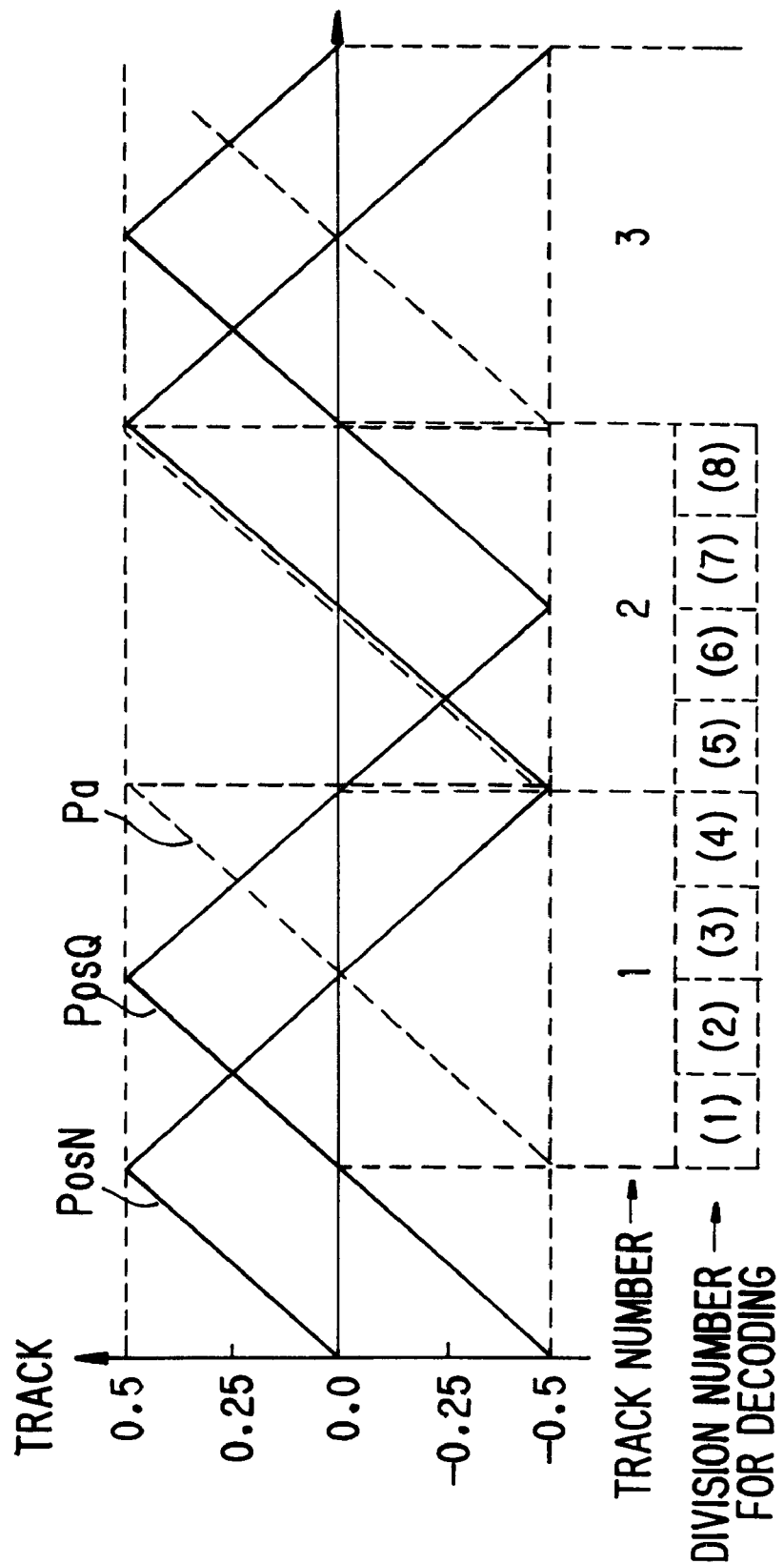
FIG. 4 is an explanatory view of signals PosN, PosQ and an offset signal.

FIG. 4 is an explanatory view of the signals PosN, PosQ and an offset signal (position deviation signal) Pa indicating the deviation from the center of a track. The abscissa represents a track number, and the ordinate represents a value (−0.5 to 0.5) of an output signal converted into the position from the center (0.0) of the track. For the convenience of explanation, it is assumed that the point at which the signal PosQ intersects the abscissa zero is a boundary of track numbers, and that the point at which the signal PosN intersects the abscissa zero is the center of a track. Even if the track boundary or the center of a track changes, there is no essential change in the following explanation. In order to generate the signals PosN, PosQ, a position signal pattern is recorded on a disk medium. As a recording method, several methods have been proposed, for example, a method of writing one pulse, a method of writing a pulse train, and a method of changing a pulse interval. In the present invention, the signals PosN, PosQ which have a phase difference of a ¼ period are selected irrespective of the recording method.

In the present invention, misreading of a track number is taken into consideration, and the following decoding tables for demodulating a position signal are created. Decoding tables are created for use in the normal case (when there is no misreading of a track number) and in an abnormal case (when there is misreading of a track number), respectively.

Figures 26, 27:
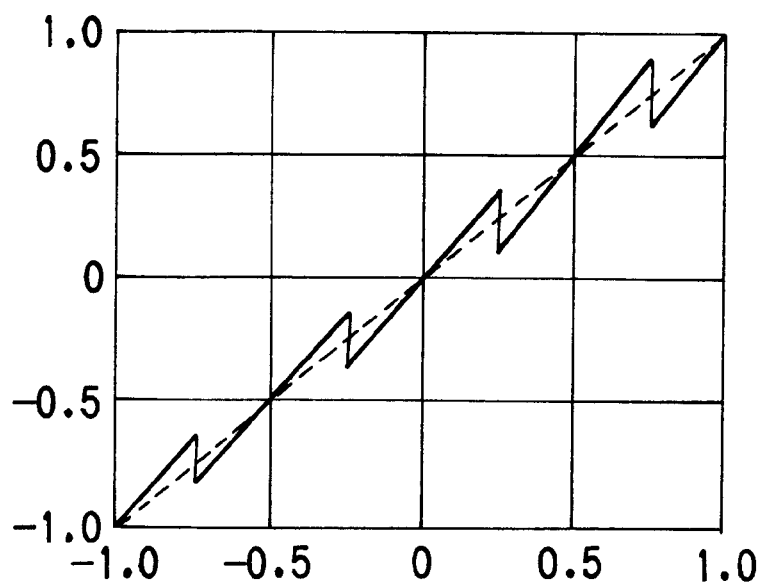
FIG. 26 shows a decoding table for a position signal.
FIG. 27 explains the problem produced by a deviation of a position sensitivity.
Figure 28:
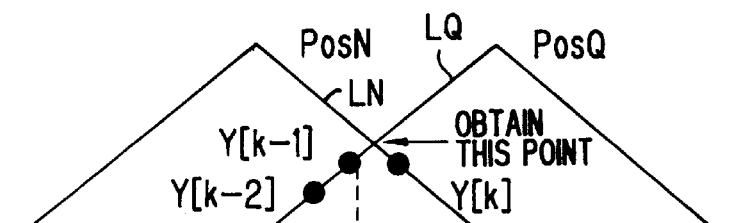
FIG. 28 is an explanatory view of a conventional position sensitivity determining method.
Figure 29:
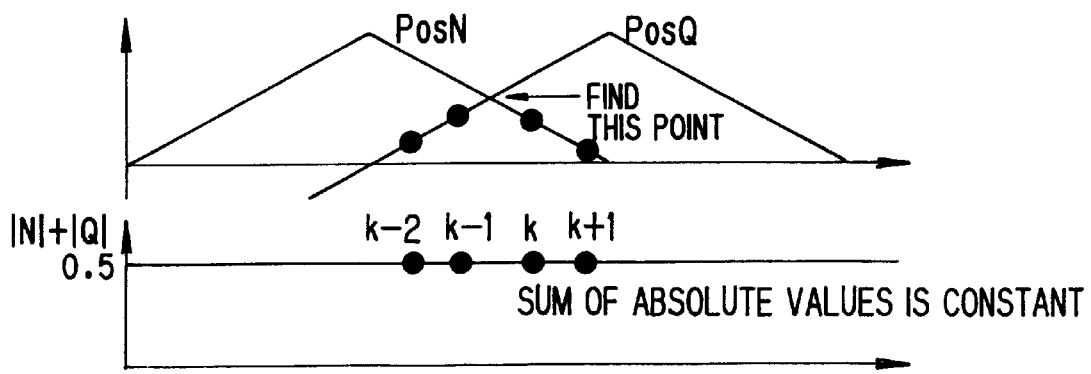
FIG. 29 is an explanatory view of another conventional position sensitivity determining method.

FIG. 5A shows a decoding table for use in the normal case. This decoding table is the same as the conventional decoding table shown in FIG. 26. In this decoding table, (i) two consecutive tracks are divided by ¼ of the track width into 8 partitions (1) to (8), as shown in FIG. 4, (ii) the signal having the smaller absolute value of the two signals PosN and PosQ is selected in each partition, (iii) the selected signals are connected with each other while the polarities are appropriately changed, thereby generating the sawtooth offset signal Pa which has a rising gradient and which alternates with a period of the track width, and (iv) the track number is added to the offset signal so as to generate a position signal (absolute position signal relative to the reference position).

FIG. 5B shows a decoding table for generating a correct position signal when a track number is misread. Misreading of a track number is caused when the head mistakes the number of the adjacent track for the number of the current track. For example, when the head moves in the ascending order of the track number, if the head regards the track number read on the preceding track Ti−1 as the track number of the current track Ti, misreading of a track number is caused. In this case, the head is situated on the preceding track Ti−i side with respect to the center of the track Ti. When the head moves in the descending order of the track number, if the head regards the track number read on the preceding track Ti+1 as the track number of the current track Ti, misreading of a track number is also caused. In this case, the head is situated on the preceding track Ti+i side with respect to the center of the track Ti.

In order to demodulate a signal when a track number is misread, judgement is made as to in which of the partitions (1) to (8) the signal is demodulated, and ±1 is added to the position signal in the decoding table for use in the normal case, depending upon to which of the adjacent tracks the partition is closer, thereby creating the decoding table shown in FIG. 5B. In FIG. 4, when the head is situated on the left side of the center of a track, in other words, when the head is situated in the partition (1), (2), (5) or (6), since the track number is 1 smaller than that in the normal case, 1 is added thereto. On the other hand, when the head is situated on the right side of the center of a track, in other words, when the head is situated in the partition (3), (4), (7) or (8), since the track number is 1 larger than that in the normal case, 1 is subtracted therefrom.

When misreading of a track number is caused, the relationship between the signs of PosN and PosQ and whether the track number is an even number or an odd number is detected, as shown in (1) to (8) of FIG. 5B. For example, when a track number is correctly read, it never occurs that the signs of PosN and PosQ are both positive and the track number is an even number. This indicates that the track number is misread. Actually, it is regarded that misreading of a track number has occurred if the sign of PosQ is positive and the read track number is an even number or if the sign of PosQ is negative and the read track number is an odd number.

Consequently, the decoding tables shown in FIGS. 5A and 5B are stored and misreading of a track number is monitored. If no misreading of a track number is detected, a position signal is generated by using the decoding table shown in FIG. 5A. On the other hand, if misreading is detected, a position signal is generated by using the decoding table shown in FIG. 5B.

(b) Second Position Signal Generating Method

In the first position signal generating method, it is necessary to store 16 cases and judge to which case the current case corresponds. For this reason, a program for generating a position signal becomes large and a large capacity of memory is required. In a second position signal generating method, the logic consisting of 16 logic expressions, as shown in FIGS. 5A and 5B is compressed so as to generate a position signal by a small program.

The 16 logic expressions for generating a position signal shown in FIGS. 5A and 5B are divided into logic expressions using the signal PosN and the logic expression using the signal PosQ, and compressed into 10 logic expressions in total, as shown in FIGS. 6A and 6B. The decoding table in FIG. 6A is used for generating a position signal when the absolute value of PosN is smaller than the absolute value of PosQ, and the decoding table in FIG. 6B is used for generating a position signal when the absolute value of PosQ is smaller than the absolute value of PosN. The mark x in FIGS. 6A and 6B means that the sign may be either positive or negative. Namely, the decoding table in FIGS. 6A and 6B are effective even if the mark x is either positive or negative.

The following two functions are then defined:

sgn(x) if x ≧0.0, sgn(x)=1.0,
  if x <0, sgn(x)=−1.0.
even(x): if x is an even number, even(x)=1.0,
  if x is an odd number, even (x)=−1.0.

By using the two functions, the logical expressions shown in FIG. 6A are compressed into 4 expressions, as shown in FIG. 7A, and the logical expressions shown in FIG. 6B are compressed into 2 expression, as shown in FIG. 7B. That is, the logical expressions shown in FIGS. 6A and 6B are compressed into 6 expressions in total.

If the logical expressions shown in FIGS. 7A and 7B are further compressed, the following program is finally obtained (represented by the C language).

$$\text{if(abs(N)} \le \text{abs(Q))} \{ \tag{1}$$

$$\text{Position} = -\text{sgn(Q)} * N + \text{Track;} \tag{2}$$

$$\text{if(sgn(Q)} * \text{even(Track)} > 0.0) \tag{3}$$

$$\text{Position} += \text{sgn(Q)} * \text{sgn(N)} * 1.0; \tag{4}$$

}else{

$$\text{Position} = \text{sgn(N)} * (Q + \text{even(Track)} * 0.5) + \text{Track;} \tag{5}$$

}

(1) is processing for judging whether or not the absolute value of PosN is smaller than the absolute value of PosQ, (2) processing for generating a position signal "Position" on the basis of the decoding table in FIG. 7A when |PosN|≦|PosQ|, (3) processing for detecting an error in the reading of a track number, (4) processing for determining the increment or decrement of the position signal obtained in (2) by "Position+" (=±1) in accordance with the sign of the signals PosN, PosQ when misreading is caused, and (5) processing for generating a position signal "Position" when the absolute value of PosQ is smaller than the absolute value of PosN.

FIG. 30 shows a chart for generating a head position signal based upon the track number (track) and signals PosQ and PosN.

When the absolute value of PosN is smaller than the absolute value of PosQ, a position signal is generated (i) by inverting the polarity of the signal PosN when the polarity of the signal PosQ is positive, and adding the polarity inverting signal −sgn(Q)*N(=−N) to the track number "Track", (ii) by adding the signal PosN (=−sgn(Q)*N=N) to the track number "Track" without inverting the polarity of the signal PosN when the polarity of the signal PosQ is negative, and (iii) by adding or subtracting 1 to and from the position signal in accordance with the signs of the signals PosN, PosQ when misreading of the track number is detected.

On the other hand, when the absolute value of the signal PosQ is smaller than the absolute value of the signal PosN, a position signal is generated by adding 0.5 or −0.5 to the signal PosQ depending upon whether the track number is an even number or an odd number, and adding the signals PosQ'(=sgn(N)*(Q+even(Track)*0.5)) to the track number "Track" without inverting the polarity of the signal PosQ' obtained by the addition when the polarity of the signal PosN is positive, while inverting it when the polarity of the signal PosN is negative.

In this manner, the logic in the normal case and the logic in an abnormal case are prepared and both are compressed to create a final program. It is thus possible to reduce the size of the program which is capable of detecting misreading of a track number. This is especially effective for a small-sized filing apparatus which has limitation to the ROM capacity of the MCU 51.

(c) Position Sensitivity Correction

Figure 9:
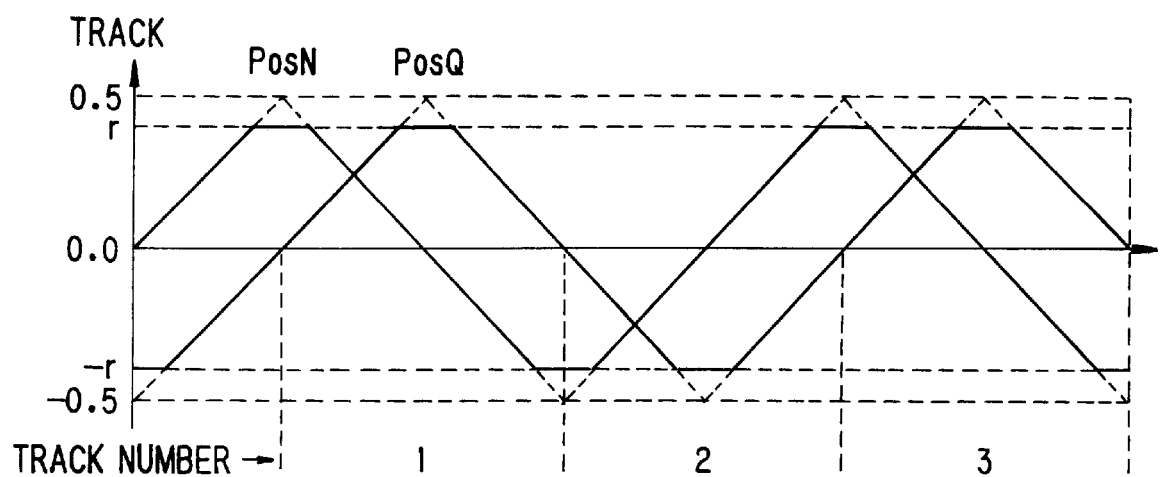
FIG. 9 is an explanatory view of the signals PosN, PosQ in a case where they saturate.

The demodulating method with logic compression taken into consideration is explained in the above. Actually, however, the wave forms of the signals PosN, PosQ are saturated, as shown in FIG. 9, due to the relationship between the core width Cw and the track width Tw of the read head shown in FIG. 8. At this time, the saturation height r of the signals PosN, PosQ is represented by the following formula:

$$r=0.5 \times (\text{head core width})/(\text{track width})$$

In addition to this influence, the outputs PosN, PosQ of the AD converter ADC fluctuate because the AGC gain is not completely constant in each apparatus. It is therefore necessary to multiply PosN or PosQ by what is called a position sensitivity. If the position sensitivity is not accurate, a difference in level is caused at the calculated position when a position signal is switched from the signal PosN to the signal PosQ or vice versa (see FIG. 27). If the position sensitivity is represented by PosErrGain, the algorithm shown above is modified in the following way.

If(abs(N) < abs(Q){
  Position=−sgn(Q)*PosErrGain*N+Track;
  if(sgn(Q)*even(Track)>0.0)
    Position+=sgn(Q)*sgn(N)*1.0;
}else{
  Position=sgn(N)*(PosErrGain*Q+even(Track)*0.5)+Track;
}

In this manner, by multiplying PosN, PosQ by the position sensitivity, positioning is possible with higher accuracy.

FIG. 31 shows a chart for generating a head position signal when the signals PosN and PosQ are compensated by the position sensitivity.

(D) DETERMINATION OF A POSITION SENSITIVITY (a) Schematic Explanation

As described above, if the position sensitivity is not appropriate, a difference in level is caused in a position signal. It is therefore necessary to determine the position sensitivity to prevent a difference in level. In the present invention, the position sensitivity is determined approximately in the following manner.

Figure 10:
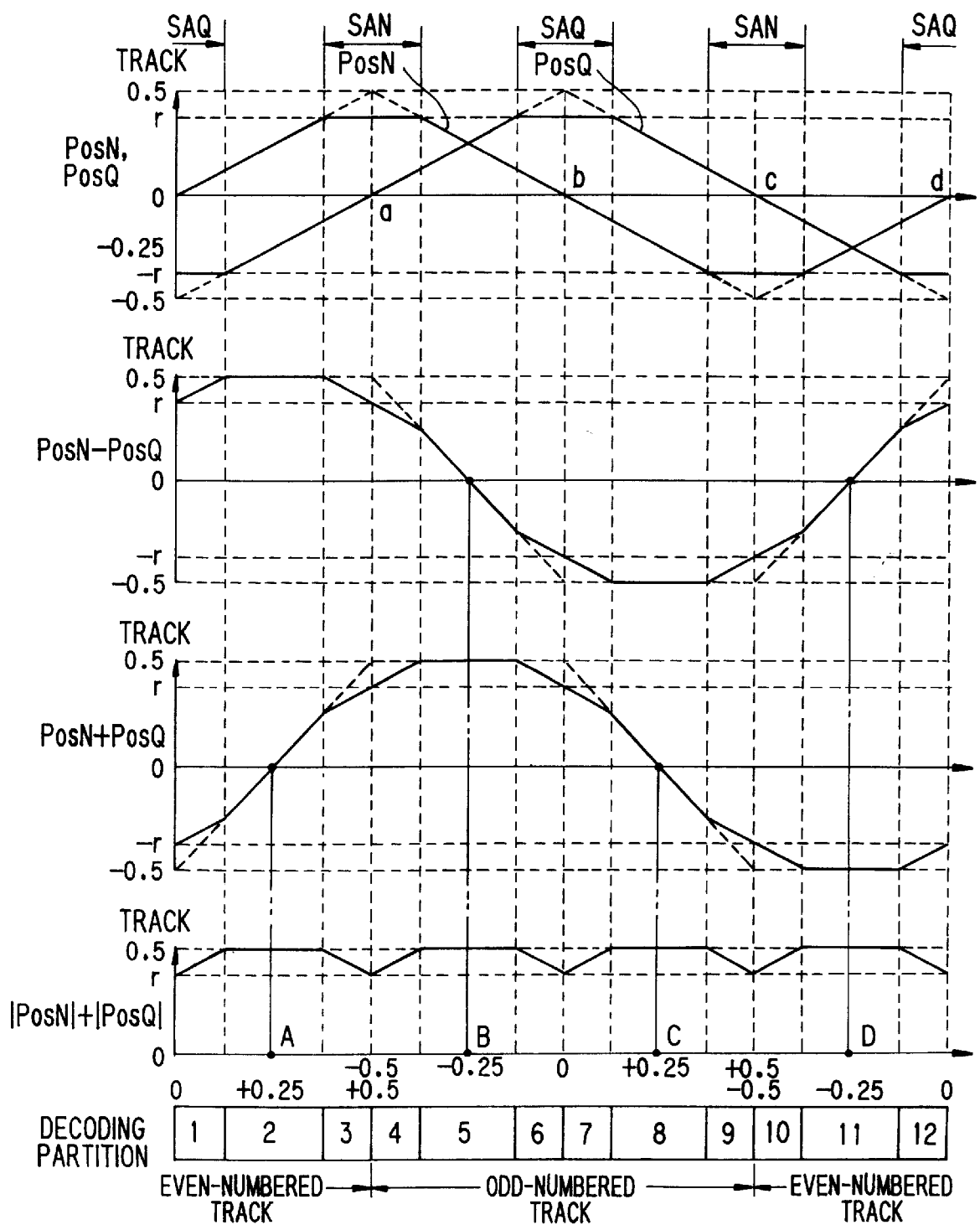
FIG. 10 shows the synthesized wave form of PosN and PosQ.

When the signals PosN, PosQ are saturated, the signals PosN, PosQ, the difference signal (PosN−PosQ), the sum signal (PosN+PosQ) and the sum signal |PosN|+|PosQ| of the absolute values of the signals PosN, PosQ become as shown in FIG. 10. It is to be noted here that the sum signal (PosN+PosQ) or the difference signal (PosN−PosQ) intersects the abscissa zero at the points A to D at which the absolute values of the signals PosN, PosQ are equal (±0.25 track from the center of the track), in other words, at the points at which PosN and PosQ are switched so as to generate a position signal.

Accordingly, in the present invention, (1) the sum signal (PosN+PosQ) and/or the difference signal (PosN−PosQ) of the signals PosN and PosQ is generated, and the head is positioned at a point A to D on a track at which the absolute values of the signals PosN, PosQ are equal by using at least either of the sum signal and the difference signal. In other words, the head is positioned at the positions at which PosN and PosQ are switched so as to generate a position signal. In this case, it is not necessary to move the head at an equal speed.

(2) The sum signal |PosN|+|PosQ| of the absolute values of the signals PosN, PosQ at that time is measured and the position sensitivity Sp is determined so that the measured value is a preset value (=0.5). Namely the position sensitivity Sp is determined so that the following equation is satisfied:

$$Sp \cdot [|PosN|+|PosQ|]=0.5.$$

(3) In this case, the saturation voltage r when the head is positioned at a point at which either of the signals PosN, PosQ is saturated (SAN represents the saturation region of PosN, and SAQ the saturation region of PosQ) is measured in advance. Judgement is made as to whether or not the absolute value of the signal PosN or PosQ is nearly equal to the saturation voltage r when the head is positioned at the ±0.25 track from the center of the track, and if the answer is YES, the sum signal |PosN|+|PosQ| of the absolute values of the signals PosN, PosQ at that time is not used to determine the position sensitivity. In this manner, it is possible to exclude the influence of the saturation region.

(b) Method of Positioning a Head at the Center of a 0.25 Track

In order to position the head accurately at a 0.25 track, both the signals PosN, PosQ are utilized. When (PosN−PosQ) and (PosN+PosQ) are generated, as shown in FIG. 10, a wave form which intersects the abscissa zero at the ±0.25 track from the center of an even-numbered and an odd-numbered track is obtained. When the absolute values of the signals PosN, PosQ are added, the amplitude is constantly equivalent to a 0.5 track. (However, in the saturation region of PosN or PosQ, the amplitude is smaller than the amplitude equivalent to a 0.5 track.) If a decoding table is created by using (PosN−PosQ) and (PosN+PosQ) for the partitions 2, 11, 8 and 5, the table shown in FIG. 11 is obtained. In FIG. 11, the symbol Tr represents a track number.

In order to generate a position signal, the sum signal (PosN+PosQ) and the difference signal (PosN−PosQ) is multiplied by ½ in the normal case. This is because the gradient of each of the sum signal and the difference signal twice as steep as that of PosN or PosQ. And in order to generate a position signal, ±0.25 is added. It is because the sum signal (PosN+PosQ) and the difference signal (PosN−PosQ) become zero at the positions which are deviated from the center of the track by ±0.25.

A position signal when a track number is misread is obtained by adding ±1 to a position signal at the normal time. In the partition 2, since the track number is misread by ±1, 1.0 is subtracted from the position signal at the normal time, and in the partition 11, since the track number is misread by −1, 1.0 is added to the position signal at the normal time. In the partition 8, since the track number is misread by +1, 1.0 is subtracted from the position signal at the normal time, and in the partition 5, since the track number is misread by −1, 1.0 is added to the position signal at the normal time An offset signal (position deviation signal) is obtained by subtracting the target position from the position signal in each partition obtained from the decoding table shown in FIG. 11, and the head is positioned at the target position of each partition by positioning control which makes the offset signal zero. The offset signal is (PosN+PosQ)/2 in the partition 2, (PosN−PosQ)/2 in the partition 11, −(PosN+PosQ)/2 in the partition 8, and −(PosN−PosQ)/2 in the partition 5.

Thereafter, each sum signal |PosN|+|PosQ| of the absolute values of the signals PosN, PosQ when the head is positioned at the target position is measured, and the average value is obtained. Since the ideal value of |PosN|+|PosQ| is 0.5, the position sensitivity Sp is determined from the following formula:

$$Sp=0.5/(|PosN|+|PosQ|).$$

(c) Method of Excluding a Saturation Region

However, this process is insufficient. When the positioning accuracy is low, or when the core width of the head is much smaller than the track width (r is small), there is probability that the value |PosN|+|PosQ| is a valve in the saturation region. If so, the amplitude of the valve |PosN|+|PosQ| may not be equivalent to the peak value of the signals PosN and PosQ. In order to avoid such inconvenience, the measured values are selected in the following way.

(1) The head is positioned at the centers a, c of the signal PosN, and at the centers b, d of the signal PosQ, and the absolute values of the signals PosN, PosQ at that time are measured. The minimum value of the measured values is set as the saturation value r.

(2) The head is positioned at the center of the ±0.25 track, and the values of |PosN|+|PosQ| is calculated. At this time, if the value |PosN| or |PosQ| is approximate to the saturation value r, the value |PosN|+|PosQ| is not utilized to determine the position sensitivity under the assumption that the head is situated in the saturation region.

(d) Algorithm for Determining a Position Sensitivity (d-1) Entire processing

Figure 12:
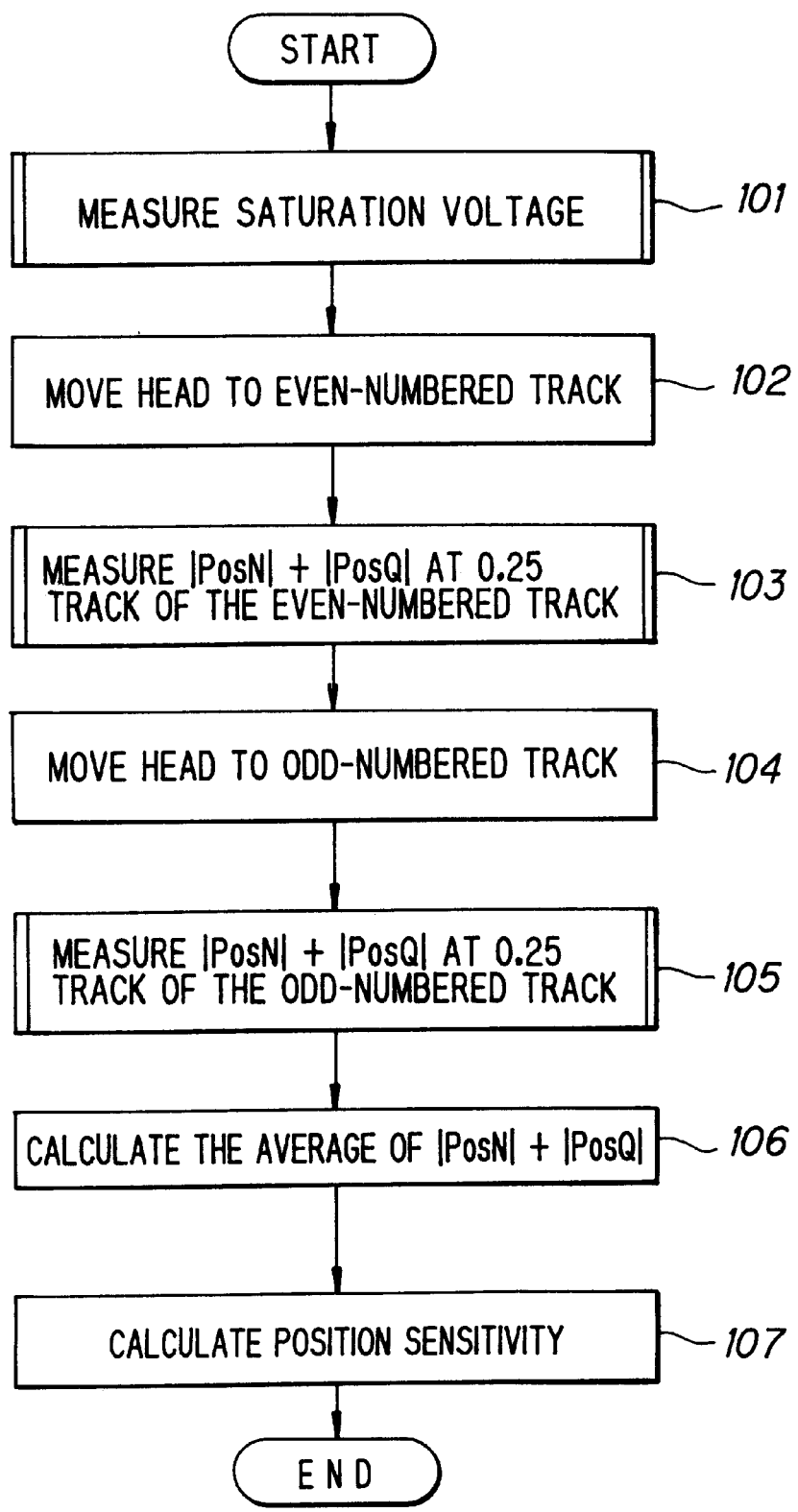
FIG. 12 is a flow chart of a position sensitivity determining process.

FIG. 12 is an entire flow chart of a position sensitivity determining process of the present invention.

The saturation voltage r is first measured (step 101), and the head is moved to an even-numbered track by normal positioning control (step 102). Thereafter, the head is positioned at the ±0.25 tracks of the even-numbered track, and the sums |PosN|+|PosQ| of the absolute values of the signals PosN, PosQ at that time are measured and stored (step 103).

After the measurement at the even-numbered track is finished, the head is moved to an odd-numbered track by normal positioning control (step 104). Thereafter, the head is positioned at the ±0.25 tracks of the odd-numbered track, and the sums |PosN|+|PosQ| of the absolute values of the signals PosN, PosQ at that time are measured and stored (step 105).

After the measurement at the odd-numbered track is finished, the average value of the measured values |PosN|+|PosQ| is calculated (step 106), and the position sensitivity is obtained from the following formula:

Sp=0.5/(|PosN|+|PosQ|) (step 107).

(d-2) Saturation voltage measuring process

Figure 13:
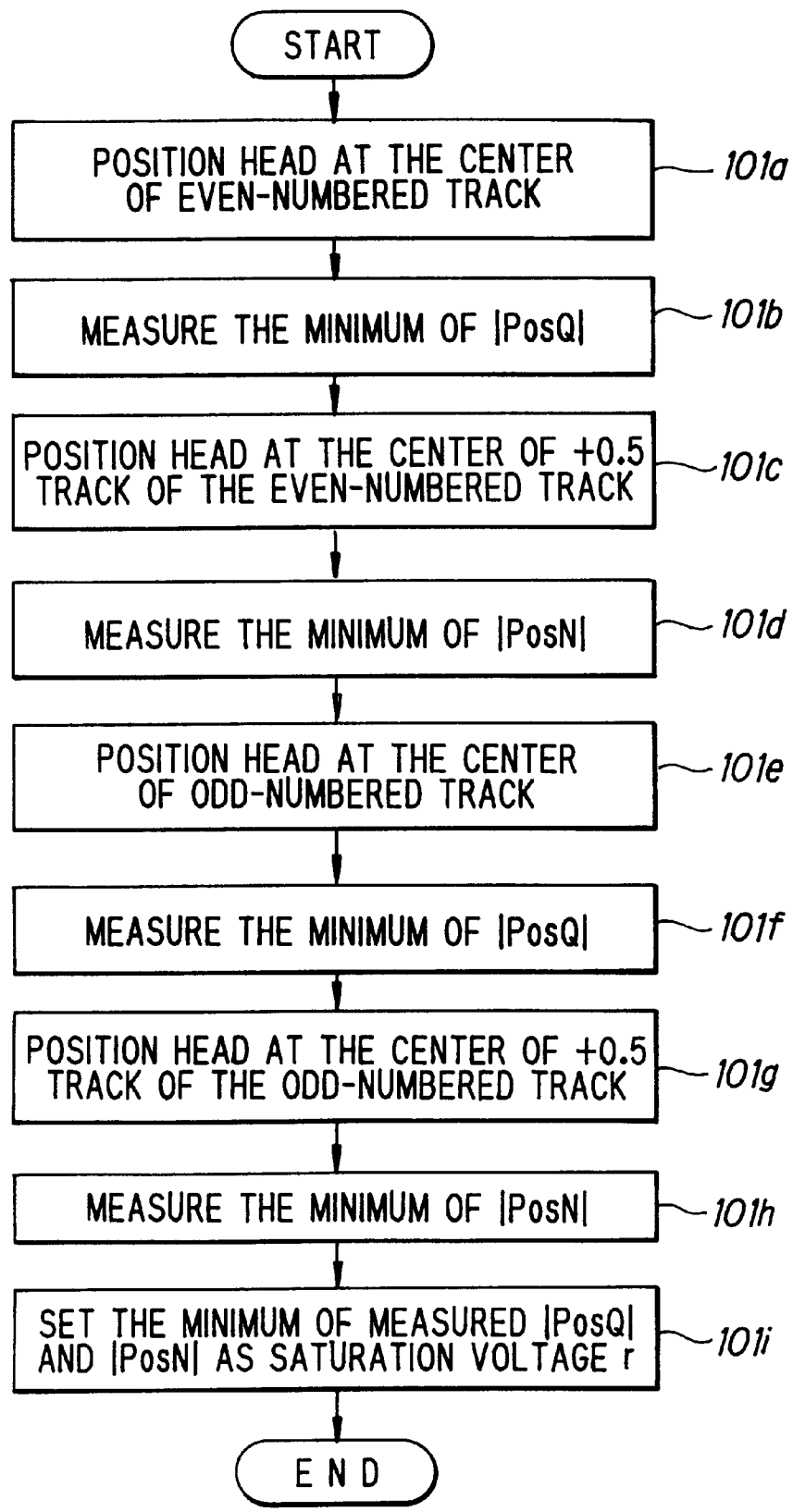
FIG. 13 is a flow chart of a saturation voltage measuring process.

FIG. 13 is a flow chart of a saturation voltage measuring process.

The head is first positioned at the point d at which PosN intersects the abscissa zero, namely, at the center of an even-numbered track (step 101a), and the minimum value of |PosQ|) is obtained (step 101b). Similarly, the head is positioned at the center a of the +0.5 track of the even-numbered track (step 101c), and the minimum value of |PosN|) is obtained (step 101d).

Thereafter, the head is positioned at the point b at which PosN intersects the abscissa zero, namely, at the center of an odd-numbered track (step 101e), and the minimum value of |PosQ|) is obtained (step 101f). Similarly, the head is positioned at the center c of the +0.5 track of the odd-numbered track (step 101g), and the minimum value of |PosN| is obtained (step 101h). After the measurement is finished, the minimum value of the measured values is set as the saturation voltage r (step 101i).

Figure 14:
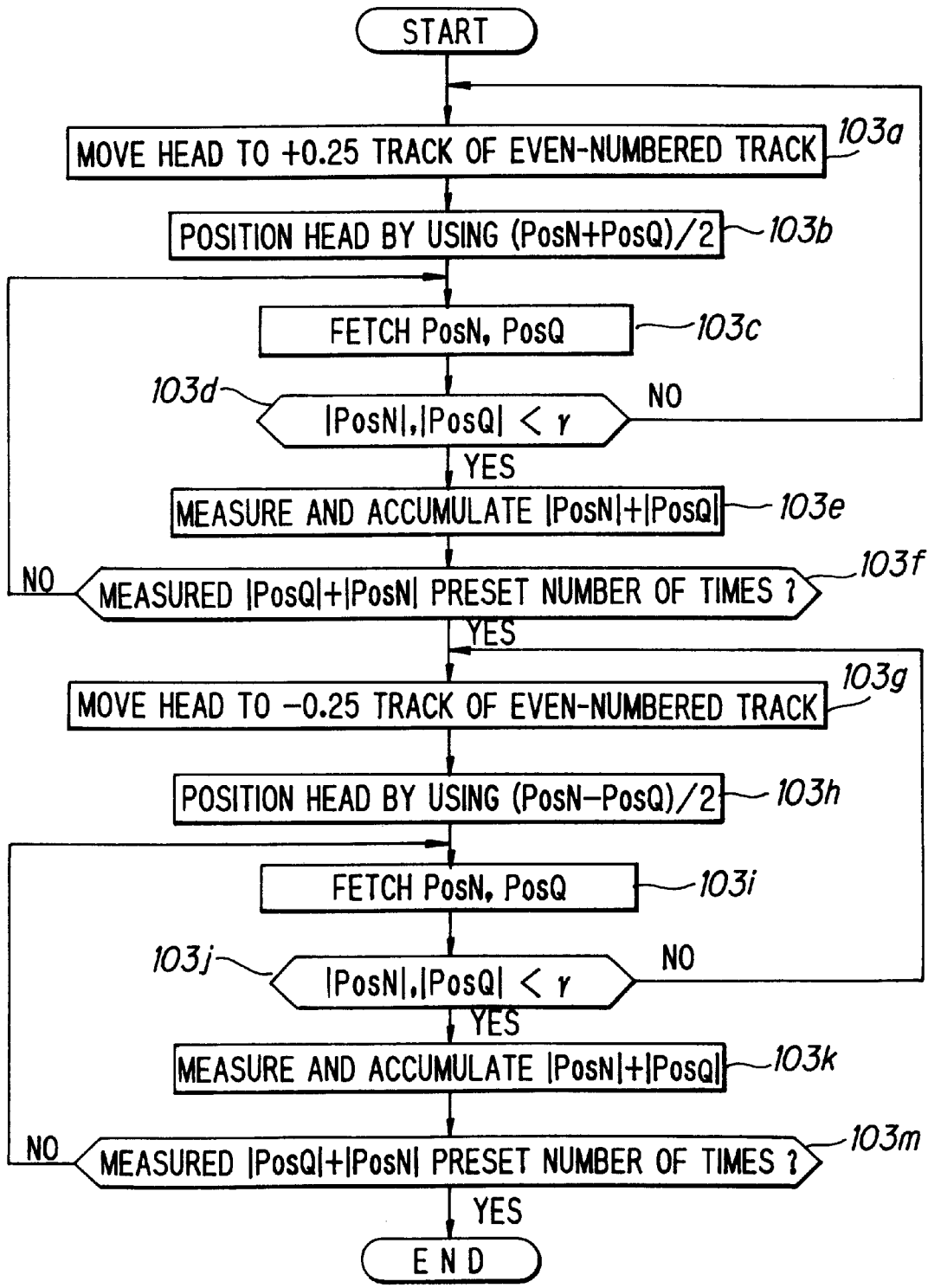
FIG. 14 is a flow chart of a process for measuring |PosN|+|PosQ| at the ±0.25 track of an even-numbered track.

(d-3) |PosN|+|PosQ| measuring processing at the ±0.25 track of an even-numbered track FIG. 14 is a flow chart of a |PosN|+|PosQ| measuring process at the ±0.25 track of an even-numbered track. The head is first moved to the +0.25 track of the even-numbered track (step 103a). Positioning control is then executed by using a position signal (PosN+PosQ)/2+0.25 (step 103b). After positioning, the signals PosN, PosQ are fetched (step 103c), and judgement is made as to whether or not both |PosN| and |PosQ| are less than the saturation voltage r (step 103d). If the answer is in the negative, the process returns to the step 103a and the subsequent processing is repeated.

If both |PosN| and |PosQ| are less than the saturation voltage r, |PosN|+|PosQ| is measured and the values measured a plurality of times are accumulated (steps 103e, 103f).

Positioning control is then returned to the ordinary positioning control which utilizes only PosN and PosQ, and the head is moved to the −0.25 track of the even-numbered track (step 103g). Positioning control is then executed by using a position signal (PosN−PosQ)/2−0.25 (step 103h). After positioning, the signals PosN, PosQ are fetched (step 103i), and judgement is made as to whether or not both |PosN| and |PosQ| are less than the saturation voltage r step 103j. If the answer is in the negative, the process returns to the step 103g and the subsequent processing is repeated.

If both |PosN| and |PosQ| are less than the saturation voltage r, |PosN|+|PosQ| is measured and the values measured a plurality of times are accumulated (steps 103k, 103m).

Figure 15:
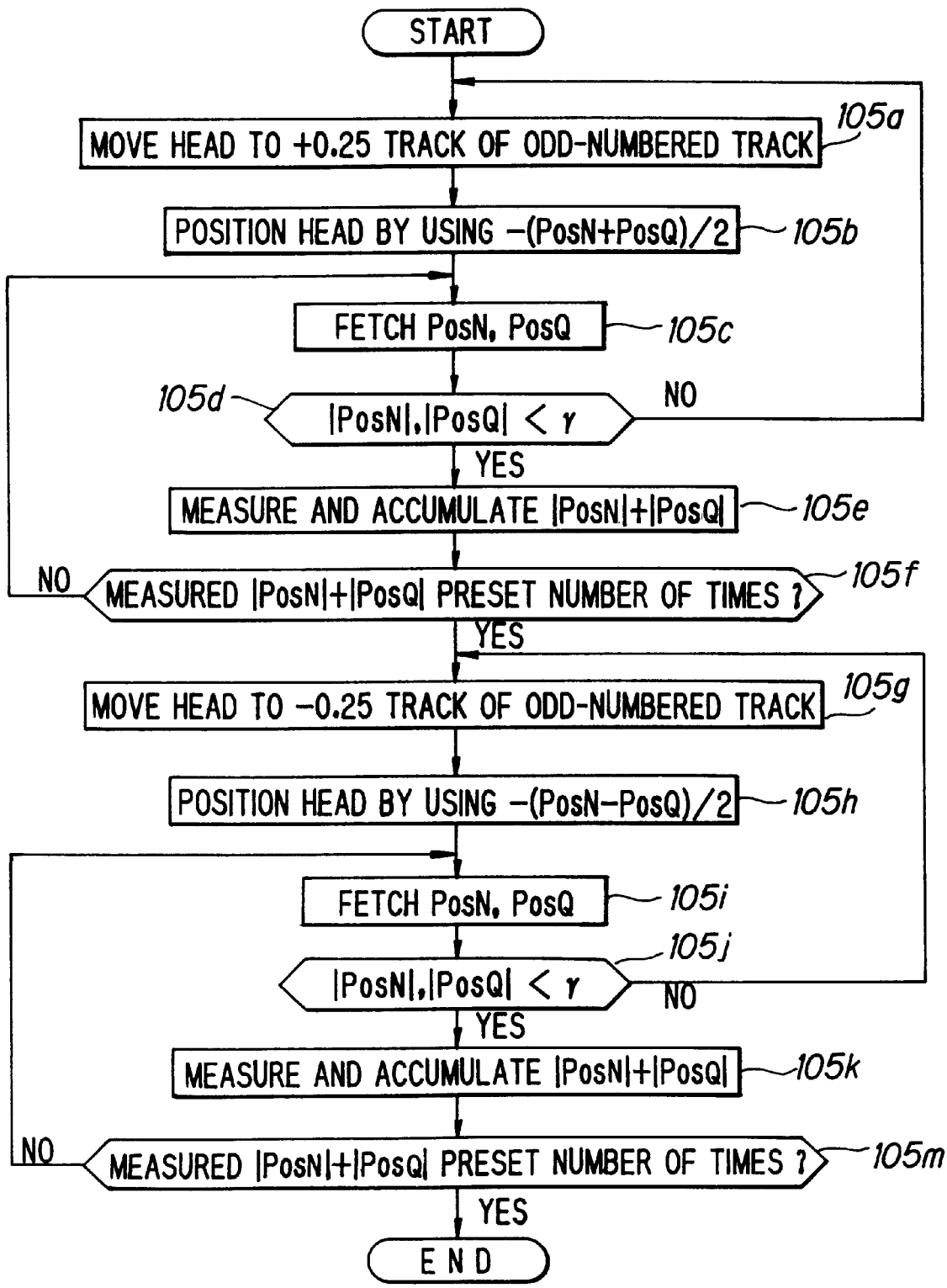
FIG. 15 is a flow chart of a process for measuring |PosN|+|PosQ| at the ±0.25 track of an odd-numbered track.

(d-4) |PosN|+|PosQ| measuring processing at the ±0.25 track of an odd-numbered track FIG. 15 is a flow chart of a |PosN|+|PosQ| measuring process at the ±0.25 track of an odd-numbered track. The head is first moved to the +0.25 track of the odd-numbered track (step 105a). Positioning control is then executed by using a position signal −(PosN+PosQ)/2+0.25 (step 105b). After positioning, the signals PosN, PosQ are fetched (step 105c), and judgement is made as to whether or not both |PosN| and |PosQ| are less than the saturation voltage r (step 105d). If the answer is in the negative, the process returns to the step 105a and the subsequent processing is repeated.

If both |PosN| and |PosQ| are less than the saturation voltage r, |PosN|+|PosQ| is measured and the values measured a plurality of times are accumulated (steps 105e, 105f).

Positioning control is then returned to the ordinary positioning control which uses only PosN, PosQ and the head is moved to the −0.25 track of the odd-numbered track (step 105g). Positioning control is then executed by using a position signal −(PosN−PosQ)/2−0.25 (step 105h). After positioning, the signals PosN, PosQ are fetched (step 105i), and judgement is made as to whether or not both |PosN| and |PosQ| are less than the saturation voltage r (s105j). If the answer is in the negative, the process returns to the step 105g and the subsequent processing is repeated.

If both |PosN| and |PosQ| are less than the saturation voltage r, |PosN|+|PosQ| is measured and the values measured a plurality of times are accumulated (steps 105k, 105m).

If the entire process of the above-described algorithm is executed, measurement is accurate, but since the number of times of seeking is large, measurement takes much times. In such case, it is possible to omit some measurement steps. For example, r is measured only once, and |PosN|+|PosQ| is also measured only twice.

(e) Processing Executed in Parallel with Position Sensitivity Determining Process In the above-described algorithm, there is a risk of the head position entering the saturation region of PosN or PosQ and positioning control becoming unstable when an external shock is applied while positioning the head at the center of the ±0.25 track. To prevent this, ordinary position signal decoding using PosN and PosQ is executed in parallel with the position sensitivity determining process so as to constantly monitor the current head position, and when the head enters the saturation region, the head is positioned at the center of the ±0.25 track by the ordinary positioning control, and |PosN|+|PosQ| is measured again (steps 103a, 103g, 105a, 105g).

There is also a possibility of positioning control becoming unstable due to the influence of the resonance of a machine. To prevent this, a position signal is calculated by the ordinary positioning control in parallel with the algorithm for calculating a positioning signal while the head is placed still at the center of the ±0.25 track. When the position is largely deviated, the measurement for determining the position sensitivity is suspended. The ordinary positioning control is executed instead, and recovery is waited for. After recovery, the position sensitivity determining processing is resumed. In this manner, when a shock is applied while measuring |PosN|+|PosQ|, it is possible to suspend the measurement, deal with the shock promptly and resume the measurement.

(f) Design of a Position Control System

If the gain is too much or too small, the stability of a control system, especially a position control system is endangered. For example, if it is assumed that the head core width has an error of ±10% and the track width also has an error of ±10%, scattering of the value of (head core width)/(track width) reaches as much as −18 to +22%. Therefore, if it is assumed that the error of a detection system such as a change in the gain of the AGC is ±5%, the error of an output system such as the gain of a voice coil motor VCM driving amplifier is also ±5%, and an error in the VCM acceleration constant (BL/M) is ±20%, the change in the gain including the scattering of the value of (head core width)/(track width) reaches as much as −41 to +62%. This means that the gain margin of 4 dB must be secured, which restricts the design of a position control system.

To solve such a problem, the structure of a control system is changed after the correction of the position sensitivity. Before the correction of the position sensitivity, a control system which is not subject to a change in the gain is designed at a slight cost of the response characteristic. After the correction of the position sensitivity, however, the design of the control system is changed to the design which places much importance on the response characteristic.

Figure 16:
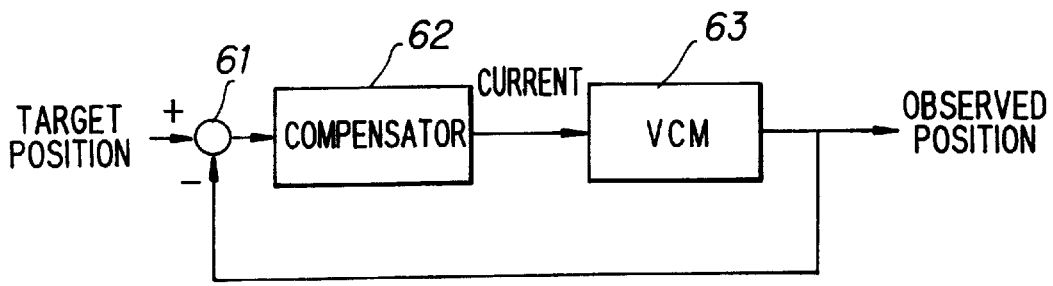
FIG. 16 is a block diagram of a positioning control system.

FIG. 16 is a block diagram of a position control system. In FIG. 16, the reference numeral 61 represents a calculator for outputting a designated current value which corresponds to the difference between the target position and the observed position, 62 a compensator and 63 a voice coil motor.

The voice coil motor VCM moves the magnetic head to the target track when a current is supplied thereto. The position y of the magnetic head is proportional to the double integral of the current u, as represented by the following formula:

$$y = (BL/m) \int \int u \, dt^2$$

wherein B is a flux density, L a coil length, and m the weight of a coil.

If the initial value is set to be 0 after the Laplace transformation of the above formula, the following formula holds:

$$(y/u) = (BL/ms^2).$$

In this manner, the relation between the current and the position is represented by the above formula which utilizes a Laplace operator s. As the characteristic of the VCM, which is the object of control, is represented by the Laplace operator s, so the characteristic of the compensator which executes control can be represented by the Laplace operator s.

In the position control system shown in FIG. 16, the structure of the compensator 32 is represented by $$K(s+a)/(s+b)$$

in the case of a lead/lag filter type, $$K\{(s+a)/s\} \cdot \{(s+b)/(s+c)\}, \text{ and}$$

in the case of a combination of a PI regulator type and a lead/lag filter type, and $$K(s^2 + as + b)/s$$

in the case of a PID regulator type. There is also a compensator which utilizes an observer. Since an actual compensator is not a continuous system but a discrete system, bilinear transformation, z-transformation, etc. are utilized for the purpose of discretion, and the formula obtained is utilized as a program of the MCU.

The variables a to c in the above formulas are designed. The method of setting the variables is different depending upon whether a quick response or tolerance to a change in the gain has the priority at the time of design. It is also possible to change the structure of the compensator itself for example between a lead lag type and a PID type.

Figure 17:
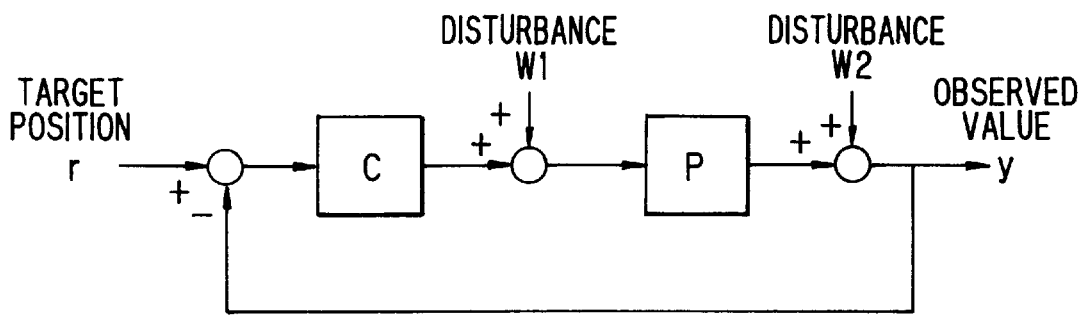
FIG. 17 is a block diagram of a general control system.

As a means for evaluating the characteristics of a control system, there is a closed loop shown in FIG. 17. In the block diagram in FIG. 17, the error between the target value r and the observed value y is multiplied by the filter C(s) and supplied to the plant (object of control) P(s), and the observed value y is fed back. The following formula is lead from the block diagram:

$$y = [CP/(1+CP)]r + [P/(1+CP)]w_1 + [1/(1+CP)]w_2.$$

From the formula, the influence of the object of control and the disturbance $w_1$, $w_2$ exerted on the observed value y is represented by the following formula:

$$y/r = CP/(1+CP) \text{ (closed loop, complementary sensitivity function)}$$

$$y/w_1 = P/(1+CP) \text{ (disturbance characteristic)}$$

$$y/w_2 = 1/(1+CP) \text{ (compression characteristic, sensitivity function)}$$

The closed loop is used when the response to a change in the target value is examined, the disturbance characteristic is used when the response to a ballistic disturbance such as a shock, and the sensitivity function is used when a disturbance applied to a position such as an eccentricity of a disk medium.

In the case of control of the voice coil motor VCM, r: target position, target speed $w_1$: shock, frictional force, FPC reaction $w_2$: eccentricity of a track, noise of a detection circuit As a loop characteristic other than the closed loop, there is an open loop (open-loop transfer function).

When a control system is designed, these characteristics are designed. It is necessary to design a control system which can suppress external influence to the minimum by investigating the above-described disturbance in detail.

Figure 18:
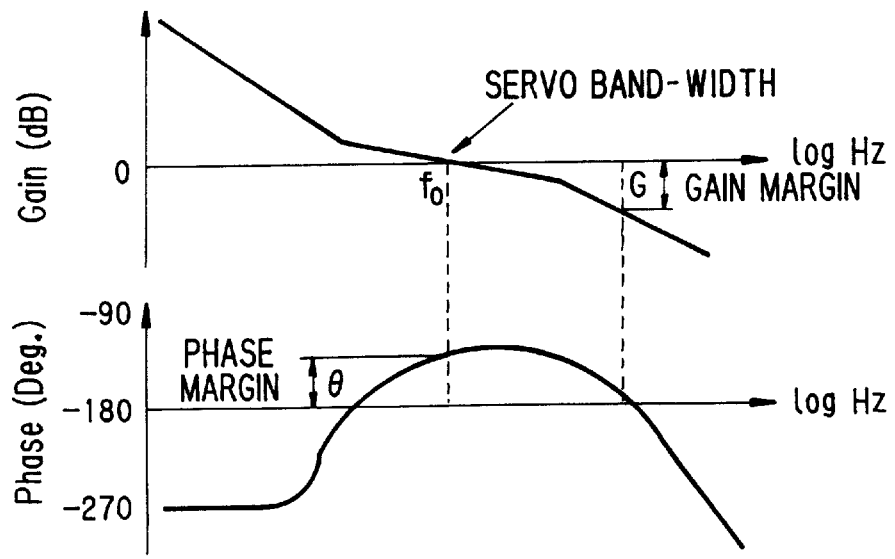
FIG. 18 shows the characteristic of an open loop.

FIG. 18 is a BODE diagram of an open loop. The symbol θ represents a phase margin, namely, the phase at a frequency $f_o$ in the servo band-width and the excess over −180 degrees. Since the control system vibrates when the phase margin is 0 degree, the phase margin is set to an adequately large value. The symbol G represents a gain margin, which is the gain when the phase margin is 0 degree. When the gain margin is 0 dB, the control system vibrates.

The gain margin of the position control system at the time of correction of the position sensitivity is set to an adequately large value so that the position control system stably operates without being influenced by even a large change in the gain at the time of correction of the position sensitivity. After the position sensitivity is corrected, the position control system is changed to the position control system which has already been designed, or an actual position control system is designed with other characteristics taken into consideration.

(g) When a Change in the Gain is Large

A change in the gain sometimes becomes so large as to exceed the presupposed range of fluctuation. In this case, conventional speed control is first executed so as to obtain the position sensitivity. Even if the position sensitivity is different, since the track number is coincident, the influence of the position sensitivity is smaller as a whole than at the time of position control, so that there is a smaller risk of speed control become being impossible. However, since the basis on which the speed is taken is the observed position, if the position is inaccurate, speed control is unstable. In this case, the value |PosN|+|PosQ| is obtained at the point of time at which the reference for generating a position signal is switched from the signal PosN to the signal PosQ (or vice versa), the following calculation is conducted:

position sensitivity=0.5/(|PosN|+|PosQ|).

Thereafter, the position sensitivity is roughly adjusted, and the position sensitivity is corrected again by the method of the present invention.

(h) Storage of the Position Sensitivity

When a filing apparatus is produced, a position signal pattern is recorded on a medium. At this time, the position sensitivity value is measured and stored in a fixed memory such as a medium (disk), a rewritable ROM and a battery backup RAM. If a position sensitivity is stored in the fixed memory in this manner, it is not necessary to measure the position sensitivity every time the filing apparatus is initiated, so that it is possible to shorten the initiation time, and shorten the time which elapses from when the power is turned on until when data is read/written.

The filing apparatus itself can store the result of measurement in the fixed memory of the filing apparatus. In this case, a mark for discriminating between the standard data and measured data is provided.

The thus-measured value is proportional to what is called scattering of the core width of the head. It is therefore possible to read the measured value of each filing apparatus from an external apparatus, and utilize the read value for the control of the core width of the head.

(i) Position Sensitivity in a Plurality of Partitions

Figure 19:
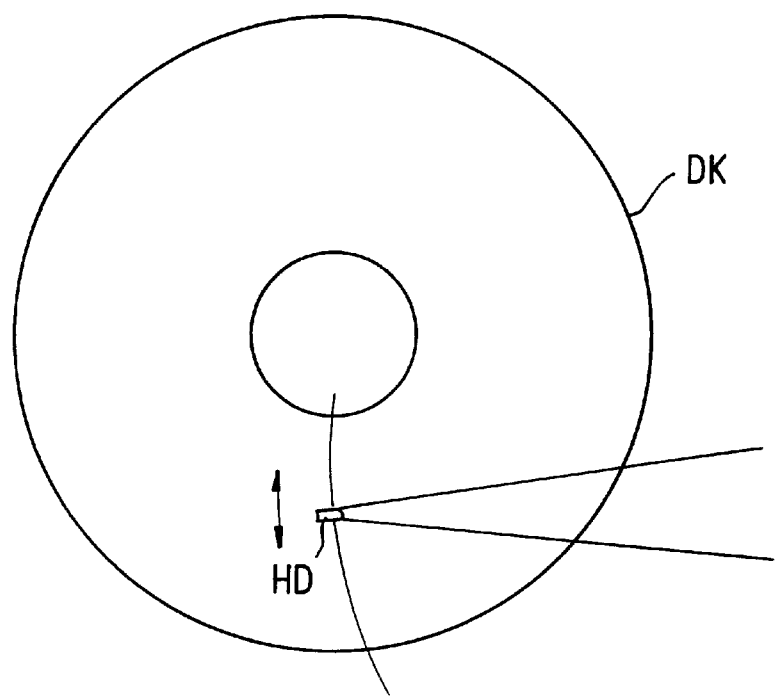
FIG. 19 is an explanatory view of a difference in the position sensitivity between the inner periphery and the outer periphery of a disk.

The position at which the position sensitivity is measured is not restricted to one position. If the position sensitivity is measured at a plurality of positions, more accurate position control is possible. As shown in FIG. 19, the head HD crosses a track on the disk DK, in the shape of an arc. Therefore, the width of the track which the head crosses, the amount of head floating and the head output level are different between an inner periphery and an outer periphery. In other words, the position sensitivity is different between an inner periphery and an outer periphery. As a countermeasure, a track is divided into a plurality of partitions and the position sensitivity in each partition is measured and stored. The signals PosN, PosQ are corrected by using the position sensitivity which corresponds to the head position. For example, if it is assumed that the entire track ranges from 0 to 2000, the whole track is divided into four partitions, namely, 0 to 499, 500 to 999, 1000 to 1499, and 1500 to 2000. The position sensitivity in each partition is measured at a representative point (e.g., 250, 750, 1250, 1750 tracks), and the position sensitivity at the representative point is stored in the memory in correspondence with the partition. The stored position sensitivity is utilized in common within each partition.

Figure 20:
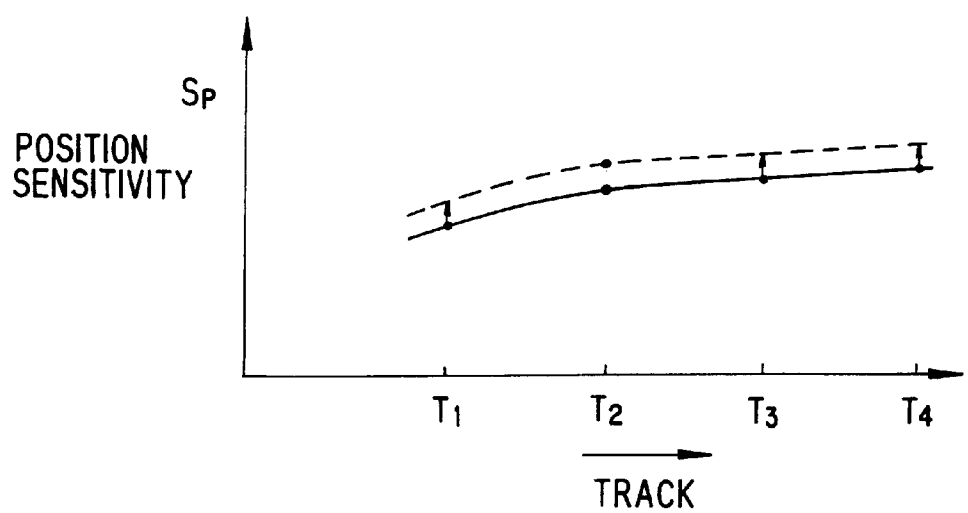
FIG. 20 is an explanatory view of the relationship between a position sensitivity and a track position.
Figure 21:
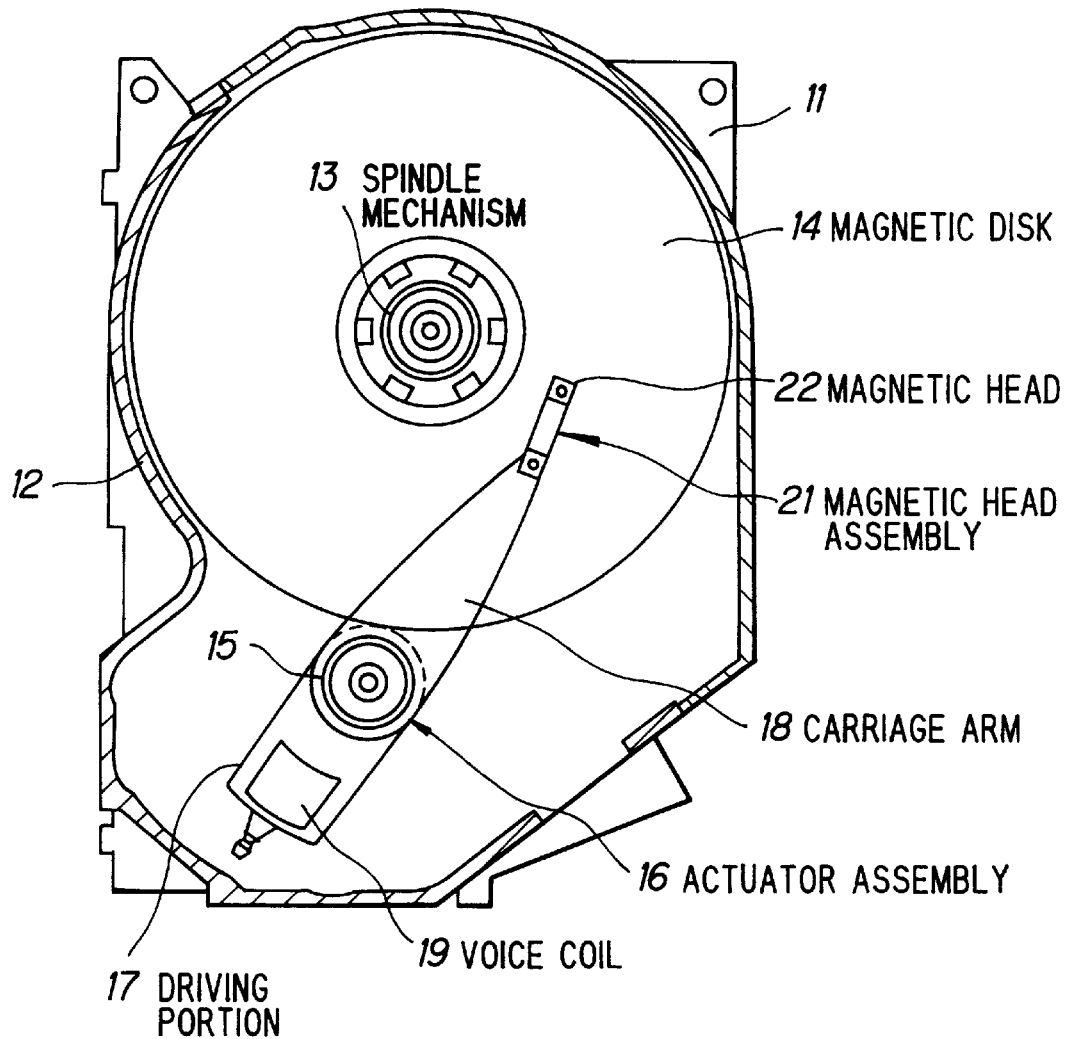
FIG. 21 shows the structure of a magnetic disk apparatus.
Figure 22:
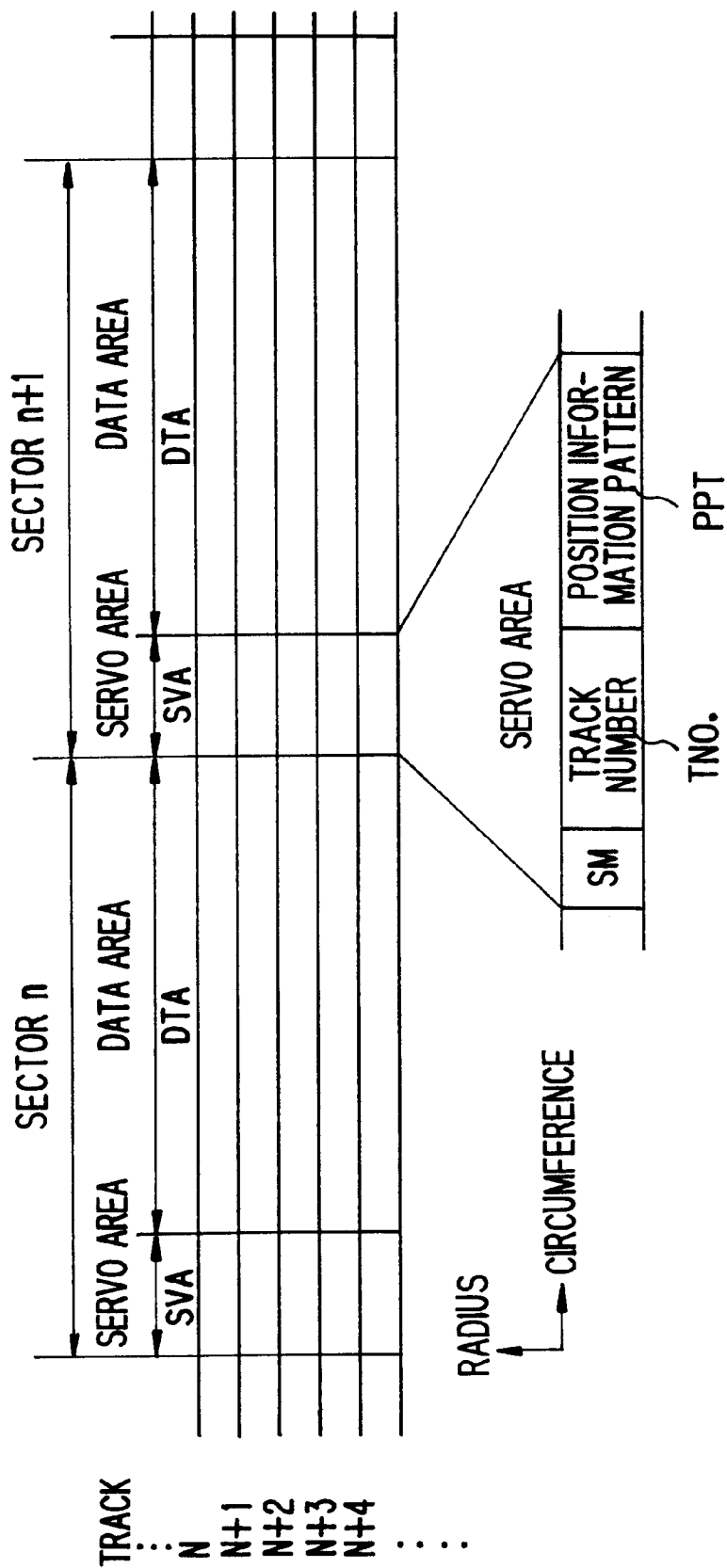
FIG. 22 shows the structure of a sector.
Figure 23A:
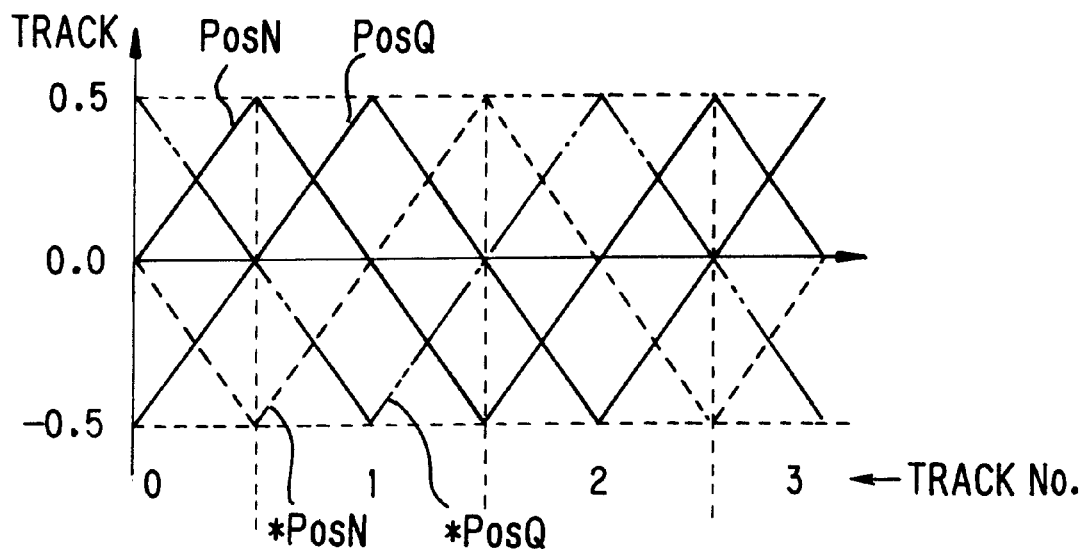
FIGS. 23A and 23B are explanatory views of the signals PosN, PosQ and a position deviation signal.
Figure 23B:
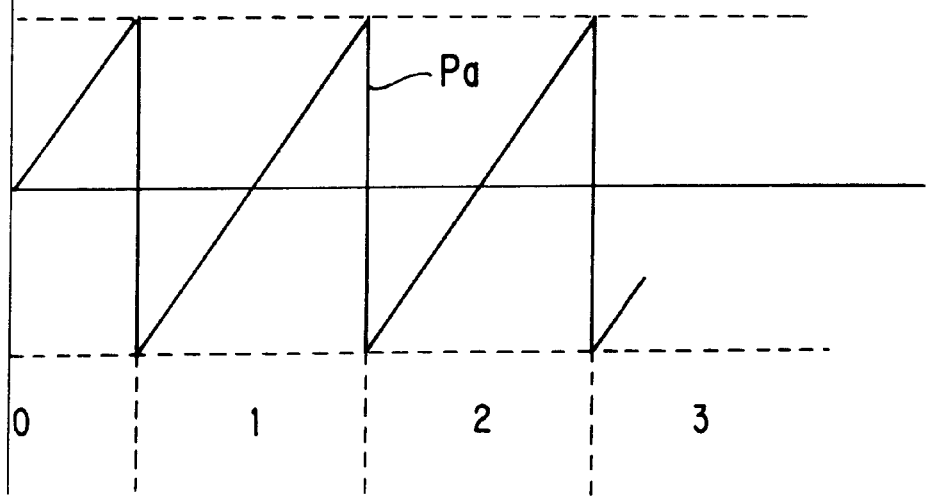

Although the characteristic curve of the track position and the position sensitivity is slightly different in filing apparatuses due to scattering in the core width of the head or the like, the shape of the curve is the same, as shown in FIG. 20. The measured position sensitivity in each partition of one medium (disk) is stored in each filing apparatus. The position sensitivity in a predetermined partitions of the filing apparatus as an object is measured, and the difference between the measured position sensitivity and the stored position sensitivity in the same partitions is calculated. The stored position sensitivities at the other sections are translated in parallel by the value equivalent to the difference so as to obtain the position sensitivity in each partition of the filing apparatus as the object. In this manner, it is possible to determine the position sensitivities in all the partitions merely by determining the position sensitivity in one partition.

As described above, according to the present invention, since a head position signal is demodulated on the basis of the absolute values of signals PosN, PosQ, the signs of the signals PosN, PosQ, the track number, and whether or not the track number is misread, it is possible to generate a correct position signal even if the track number is misread. In addition, if a position signal is generated by using the value corrected by multiplying the signals PosN, PosQ by a position sensitivity, the positioning accuracy is enhanced.

According to the present invention, since a saturation voltage when the head is positioned at a point of a track at which either of the signals PosN, PosQ is saturated is measured in advance, judgement is made as to whether of not the absolute value of the signal PosN or PosQ is substantially equal to the saturation voltage when the head is positioned at a point of the track at which the absolute values of the signals PosN, PosQ are equal, and if the answer is YES, the sum signal |PosN|+|PosQ| of the absolute values of the signals PosN, PosQ at that time is not used to determine the position sensitivity, it is possible to determine the position sensitivity accurately by excluding the values in the vicinity of saturation, even if the p are saturated.

The position sensitivity is determined by a head positioning control system of the filing apparatus which operates stably without being subject to a change in the gain, and the head positioning control system is returned to an ordinary head positioning control system after the position sensitivity is determined. In this manner, it is possible to continue the position sensitivity determining control even if a large change is caused in the gain during the position sensitivity determining control.

According to the present invention, since processing for generating a position signal by using the signals PosN, PosQ and the track number is executed in parallel with the position sensitivity determining processing, it is possible to return the head to a predetermined position on the basis of the position signal, and to continue the position sensitivity determining processing, even if the head position moves to a saturation region or leaves from the target track.

Since the position sensitivity is determined by a head positioning control system of the filing apparatus which operates stably without being subject to a change in the gain, and the head positioning control system is returned to an ordinary head positioning control system after the position sensitivity is determined in the present invention, it is possible to continue the position sensitivity determining control even if a large change is caused in the gain during the position sensitivity determining control.

According to the present invention, since the determined position sensitivity is stored in a fixed memory which is capable of holding the stored state even if the power is turned off, and the signals PosN, PosQ are corrected by reading the position sensitivity when the filing apparatus is started. In this manner, it is possible to obviate the position sensitivity determining control once the position sensitivity is determined.

Furthermore, since a track is divided into a plurality of partitions, a position sensitivity is measured in each partition, and the signals PosN, PosQ are corrected by using the position sensitivity which corresponds to the track position, it is possible to correct the signals PosN, PosQ by using the position sensitivity which corresponds to the track position, and accurate positioning control is possible.

According to the present invention, the position sensitivity measured in each partition of a predetermined medium is stored, and a position sensitivity in a predetermined partition of a filing apparatus as the object of measurement is measured. The difference between the measured position sensitivity and the stored position sensitivity in the corresponding partition is calculated. Thereafter, the stored position sensitivities in the other partitions are translated in parallel by the value corresponding to the difference so as to obtain the position sensitivities in the other partitions of the filing apparatus as the object. It is therefore easy to determine the position sensitivity in a short time.

As many apparently widely different embodiments of the present invention can be made without departing from the spirit and scope thereof, it is to be understood that the invention is not limited to the specific embodiment thereof except as defined in the appended claims.

What is claimed is:

1. A position signal demodulating method for generating a head position signal in a disk apparatus by using two triangular signals PosN and PosQ reproduced from a medium using a head, which have a phase difference of a ¼ period, and a track number recorded on the medium, said method comprising the steps of:

reading the track number;

demodulating the absolute values and the polarity of the signals PosN and PosQ;

determining whether the track number has been misread on the basis of the track number, the absolute values of the signals PosN and PosQ and the signs of the signals PosN and PosQ;

generating, if no misread is determined, the head position signal using a numerical formula of the track number, and the absolute values and signs of this signals PosN and PosQ; and generating, if a misread is determined, the head position signal using a modified numerical formula of the track number, and the absolute values and signs of the signals PosN and PosQ.

2. A position signal demodulating method for generating a head position signal in a disk apparatus by using two triangular signals PosN and PosQ reproduced from a medium, which have a phase difference of a ¼ period and a track number which is recorded on said medium, said method comprising the steps of:

comparing the absolute value of the signal PosN with the absolute value of the signal PosQ;

if the absolute value of the signal PosN is smaller than or equal to the absolute value of said signal PosQ, generating a head position signal by inverting the polarity of the signal PosN if the polarity of said signal PosQ is positive, and adding the polarity inverted signal to the track number, otherwise, if said polarity of the signal PosQ is negative, adding said signal PosN to the track number without inverting the polarity of said signal PosN, and adding 1 to, or subtracting 1 from said position signal in accordance with the signs of the signals PosN, PosQ when misreading of the track number is detected; and otherwise, if the absolute value of said signal PosQ is smaller than the absolute value of said signal PosN, generating a head position signal by adding 0.5 to or subtracting 0.5 from the signal PosQ depending upon whether said track number is an even number or an odd number, and adding the resulting signal to the track number without inverting the polarity thereof when the polarity of the signal PosN is positive, while inverting the polarity of the signal when the polarity of the signal PosN is negative.

3. A position signal demodulating method according to claim 2, further comprising the step of correcting the signals PosN, PosQ by multiplying the signals PosN, PosQ by a position sensitivity factor so that the head position signal is generated by using the corrected values.

4. A position sensitivity determining method for generating a head position signal in a disk apparatus by using a signal obtained by multiplying two triangular signals PosN and PosQ reproduced from a medium, having a phase difference of a ¼ period, by a position sensitivity factor, and by using a track number which is recorded on said medium, said method comprising the steps of:

generating one of a sum signal (PosN+PosQ) and a difference signal (PosN−PosQ) of said signals PosN and PosQ;

positioning a head at a point of a track at which the absolute value of the signals PosN, PosQ are equal by using one of said sum signal and said difference signal;

measuring the sum signal |PosN|+|PosQ| of the absolute values of said signals PosN, PosQ at that time; and determining said position sensitivity factor so that the product of the measured sum signal |PosN|+|PosQ| and the position sensitivity factor is a preset value.

5. A position sensitivity determining method according to claim 4, further comprising the step of correcting the signals PosN, PosQ by multiplying the signals PosN, PosQ by the position sensitivity factor so that the head position signal is generated using the corrected values.

6. A position sensitivity determining method according to claim 5, further comprising the steps of:

storing the determined position sensitivity factor in a fixed memory which is capable of holding the stored state even if power is turned off; and correcting the signals PosN, PosQ by reading said position sensitivity factor when the disk apparatus is started.

7. A position sensitivity determining method according to claim 5, further comprising the steps of:

dividing a track into a plurality of partitions, and measuring and storing a position sensitivity factor for each partition; and correcting said signals PosN, PosQ by using the position sensitivity factor which corresponds to the track position.

8. A position sensitivity determining method according to claim 7, further comprising the steps of:

storing said position sensitivity factor measured in each partition of a predetermined medium;

measuring a position sensitivity factor in a predetermined partition of the disk apparatus as the object of measurement;

calculating the difference between the measured position sensitivity factor and the stored position sensitivity factor in the corresponding partition; and translating the stored position sensitivity factor for each of the other partitions in parallel by the value equivalent to said difference so as to obtain the position sensitivity factor in each of the other partitions of said disk apparatus as the object.

9. A position sensitivity determining method according to claim 4, further comprising the steps of:

measuring a saturation voltage when the head is positioned at a point of a track at which either of the signals PosN, PosQ is saturated;

judging whether or not the absolute value of the signal PosN or PosQ is nearly equal to the saturation voltage when the head is positioned at a point of a track at which the absolute values of the signals PosN, PosQ are equal, wherein in a case where the absolute value of said signal PosN or PosQ is nearly equal to said saturation voltage the sum signal |PosN|+|PosQ| is not used to determine said position sensitivity factor.

10. A position sensitivity determining method according to claim 4, further comprising the steps of:

executing processing for generating a head position signal in parallel with the position sensitivity factor determining processing, using the signals PosN, PosQ and the track number; and returning the head to a predetermined position by using the head position signal when the head position is deviated.

\* \* \* \* \*